United States Patent
York et al.

(10) Patent No.: US 10,083,321 B2
(45) Date of Patent: *Sep. 25, 2018

(54) METHODS AND SYSTEMS FOR NETWORK-BASED ANALYSIS, INTERVENTION, AND ANONYMIZATION

(71) Applicant: Pearson Education, Inc., New York, NY (US)

(72) Inventors: Sean A. York, Harrisonburg, VA (US); Scott A. Hellman, Centennial, CO (US); James Wyatt, Parker, CO (US); Marko Rodriguez, Santa Fe, NM (US); Steven H. Hill, Austin, TX (US)

(73) Assignee: PEARSON EDUCATION, INC., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/849,503

(22) Filed: Dec. 20, 2017

(65) Prior Publication Data

US 2018/0121678 A1    May 3, 2018

Related U.S. Application Data

(63) Continuation of application No. 14/928,061, filed on Oct. 30, 2015, now Pat. No. 9,928,383.

(Continued)

(51) Int. Cl.
*G06F 21/62* (2013.01)
*H04L 29/06* (2006.01)

(52) U.S. Cl.
CPC ...... *G06F 21/6254* (2013.01); *H04L 63/0421* (2013.01); *H04L 63/107* (2013.01); *G06F 2221/2111* (2013.01)

(58) Field of Classification Search
CPC ......... G06F 21/6254; G06F 2221/2111; H04L 63/107; H04L 63/0421
See application file for complete search history.

(56) References Cited

U.S. PATENT DOCUMENTS 8,504,481 B2 *  8/2013  Motahari ............. G06F 21/577
                                                            705/51
8,548,503 B2 * 10/2013  Oh ...................... H04L 12/1818
                                                           455/414.2

(Continued)

FOREIGN PATENT DOCUMENTS

WO    2009/149262 A1    12/2009

OTHER PUBLICATIONS

International Search Report and Written Opinion dated Feb. 23, 2016, for International Application No. PCT/US2015/058467, 12 pages.

*Primary Examiner* — Joseph P Hirl
*Assistant Examiner* — Stephen Gundry
(74) *Attorney, Agent, or Firm* — Kilpatrick Townsend & Stockton LLP

(57) ABSTRACT

Systems and method for alerting a user device based on a proposed anonymization of a contribution to a conversation thread via one or several location-based anonymization rules are disclosed herein. The system can include a user device that can have location-determining features that can determine a physical location of the user device; a network interface that can exchange data with a server via a communication network; and an I/O subsystem that can convert electrical signals to user-interpretable outputs in a user interface. The system can include a server that can: receive a contribution from the user device; determine an anonymization level for applying to the contribution; identify a potential identifier in the content of the contribution; ano- (Continued)

nymize the potential identifier according to the determined anonymization level; and generate and provide an alert to the user device.

19 Claims, 13 Drawing Sheets

Related U.S. Application Data

(60) Provisional application No. 62/072,932, filed on Oct. 30, 2014.

(56) References Cited

U.S. PATENT DOCUMENTS

| | | | |
|---|---|---|---|
| 8,694,646 B1* | 4/2014 | Kothari | H04L 63/0435 709/227 |
| 8,726,398 B1 | 5/2014 | Tock | |
| 8,753,200 B1 | 6/2014 | Supanc et al. | |
| 8,972,605 B2 | 3/2015 | Fletcher | |
| 9,076,016 B2* | 7/2015 | Raman | G06F 21/6263 |
| 9,231,920 B1 | 1/2016 | Tock | |
| 9,292,696 B1* | 3/2016 | Kothari | G06F 21/60 |
| 9,300,637 B1* | 3/2016 | Kothari | H04L 63/0428 |
| 9,307,035 B1* | 4/2016 | Berentey | H04W 4/21 |
| 9,323,818 B1 | 4/2016 | Kothari | |
| 9,330,145 B2* | 5/2016 | Satyanarayanan | G06F 17/3053 |
| 9,338,220 B1 | 5/2016 | Kothari | |
| 9,356,993 B1 | 5/2016 | Kothari | |
| 9,413,526 B1 | 8/2016 | Kothari | |
| 9,432,342 B1 | 8/2016 | Kothari | |
| 9,450,956 B1* | 9/2016 | Giobbi | H04L 63/0853 |
| 9,483,954 B2 | 11/2016 | York et al. | |
| 9,613,227 B1 | 4/2017 | Kothari | |
| 9,619,482 B1* | 4/2017 | Kothari | G06F 17/30194 |
| 9,654,463 B2* | 5/2017 | Brannon | H04L 63/0823 |
| 9,667,741 B1 | 5/2017 | Kothari | |
| 9,703,967 B1* | 7/2017 | Kothari | G06F 21/606 |
| 9,720,893 B2* | 8/2017 | Bisaga | G06F 17/24 |
| 9,722,973 B1* | 8/2017 | Kothari | H04L 63/0428 |
| 2001/0036224 A1 | 11/2001 | Demello | |
| 2002/0142278 A1 | 10/2002 | Whitehurst et al. | |
| 2004/0033475 A1 | 2/2004 | Mizuma et al. | |
| 2004/0202991 A1 | 10/2004 | Clark et al. | |
| 2006/0070117 A1 | 3/2006 | Spalink | |
| 2007/0220016 A1* | 9/2007 | Estrada | G06F 17/30867 |
| 2008/0038705 A1 | 2/2008 | Kerns et al. | |
| 2008/0040370 A1 | 2/2008 | Bosworth et al. | |
| 2008/0126476 A1* | 5/2008 | Nicholas | G06Q 10/10 709/203 |
| 2009/0075709 A1 | 3/2009 | Park | |
| 2009/0157658 A1* | 6/2009 | Bonev | G06Q 30/00 |
| 2009/0182873 A1 | 7/2009 | Spalink | |
| 2010/0049803 A1* | 2/2010 | Ogilvie | G06F 21/6245 709/204 |
| 2010/0070510 A1 | 3/2010 | Agarwal et al. | |
| 2010/0159438 A1 | 6/2010 | German et al. | |
| 2011/0105077 A1 | 5/2011 | Chandrasekaran | |
| 2011/0117534 A1 | 5/2011 | Berger et al. | |
| 2011/0125844 A1* | 5/2011 | Collier | H04L 12/00 709/204 |
| 2011/0221568 A1 | 9/2011 | Giobbi | |
| 2011/0320373 A1* | 12/2011 | Lee | G06Q 50/01 705/319 |
| 2012/0040326 A1 | 2/2012 | Larson-Rutter et al. | |
| 2012/0078653 A1 | 3/2012 | Sachs et al. | |
| 2012/0244505 A1 | 9/2012 | Lang et al. | |
| 2012/0278329 A1* | 11/2012 | Borggaard | G06F 17/30699 707/738 |
| 2012/0303635 A1 | 11/2012 | Summers | |
| 2012/0317205 A1* | 12/2012 | Lahiani | G06Q 10/10 709/206 |
| 2013/0040277 A1* | 2/2013 | Linton | G06Q 10/101 434/350 |
| 2013/0160138 A1 | 6/2013 | Schultz | |
| 2013/0226949 A1* | 8/2013 | Ogilvie | G06F 17/30283 707/758 |
| 2013/0254889 A1 | 9/2013 | Stuntebeck | |
| 2013/0311660 A1 | 11/2013 | Dabbiere | |
| 2013/0332987 A1* | 12/2013 | Tenneti | G06F 21/10 726/1 |
| 2014/0115715 A1* | 4/2014 | Pasdar | G06F 21/6245 726/26 |
| 2014/0129628 A1* | 5/2014 | Fletcher | H04W 12/02 709/204 |
| 2014/0236916 A1* | 8/2014 | Barrington | G06F 17/30864 707/706 |
| 2014/0272911 A1 | 9/2014 | York et al. | |
| 2014/0295957 A1 | 10/2014 | Supanc et al. | |
| 2014/0297765 A1* | 10/2014 | Beckley | H04L 51/32 709/206 |
| 2014/0308650 A1 | 10/2014 | Loring et al. | |
| 2015/0128287 A1* | 5/2015 | LaFever | G06F 21/6254 726/27 |
| 2015/0200915 A1 | 7/2015 | Yeager | |
| 2015/0242638 A1* | 8/2015 | Bitran | G06F 21/6245 726/26 |
| 2015/0244681 A1 | 8/2015 | Blumenfeld | |
| 2015/0346937 A1* | 12/2015 | Mahmoudian-Bidgoly | G06F 3/0484 715/753 |
| 2016/0021039 A1* | 1/2016 | Woo | H04L 51/046 715/752 |
| 2016/0042198 A1 | 2/2016 | Kapoor | |
| 2016/0050525 A1* | 2/2016 | Droll | H04W 4/021 455/456.3 |
| 2016/0057148 A1* | 2/2016 | Micucci | H04L 67/1044 726/28 |
| 2016/0065610 A1 | 3/2016 | Peteroy | |
| 2016/0078120 A1* | 3/2016 | Pradeep | H04L 67/02 707/737 |
| 2016/0078191 A1* | 3/2016 | Casimiro | G16H 50/30 705/3 |
| 2016/0078350 A1* | 3/2016 | Yarvis | G06Q 30/0631 706/11 |
| 2016/0080403 A1* | 3/2016 | Cunningham | H04L 63/1425 726/23 |
| 2016/0094476 A1* | 3/2016 | Dronen | G06F 9/4881 709/226 |
| 2016/0094883 A1* | 3/2016 | Tidwell | H04N 21/4524 725/109 |
| 2016/0124614 A1* | 5/2016 | Bromberg | G06F 3/04842 715/733 |
| 2016/0124999 A1* | 5/2016 | Gonzalez Brenes | G06F 17/30297 707/803 |
| 2016/0125200 A1 | 5/2016 | York et al. | |
| 2016/0127248 A1* | 5/2016 | Gonzalez Brenes | H04L 47/365 370/477 |
| 2016/0203349 A1* | 7/2016 | Giobbi | G06K 7/10366 702/150 |
| 2016/0321100 A1* | 11/2016 | Jones | G06F 9/46 |
| 2017/0041315 A1* | 2/2017 | Giobbi | G06F 21/32 |
| 2017/0048269 A1* | 2/2017 | York | G06F 21/6254 |
| 2017/0126700 A1* | 5/2017 | Hurst | H04L 63/108 |
| 2017/0163429 A1* | 6/2017 | Stuntebeck | H04L 9/3263 |

\* cited by examiner

METHODS AND SYSTEMS FOR NETWORK-BASED ANALYSIS, INTERVENTION, AND ANONYMIZATION

CROSS-REFERENCES TO RELATED APPLICATIONS

This application is a continuation of U.S. Non-Provisional application Ser. No. 14/928,061 filed on Oct. 30, 2015 and entitled "METHODS AND SYSTEMS FOR NETWORK-BASED ANALYSIS, INTERVENTION, AND ANONYMIZATION", which claims the benefit of U.S. Provisional Application No. 62/072,932, filed Oct. 30, 2014 and entitled "METHODS AND SYSTEMS OF EDUCATIONAL NETWORK-BASED ANALYSIS, INTERVENTION, AND ANONYMIZATION", which are herein incorporated by reference in their entirety for all purposes.

BACKGROUND

This application relates to the field data transmission and network optimization.

A computer network or data network is a telecommunications network which allows computers to exchange data. In computer networks, networked computing devices exchange data with each other along network links (data connections). The connections between nodes are established using either cable media or wireless media. The best-known computer network is the Internet.

Network computer devices that originate, route and terminate the data are called network nodes. Nodes can include hosts such as personal computers, phones, servers as well as networking hardware. Two such devices can be said to be networked together when one device is able to exchange information with the other device, whether or not they have a direct connection to each other.

Computer networks differ in the transmission media used to carry their signals, the communications protocols to organize network traffic, the network's size, topology and organizational intent. In most cases, communications protocols are layered on (i.e. work using) other more specific or more general communications protocols, except for the physical layer that directly deals with the transmission media.

As the volume of data exchanged between nodes in computer networks has increased, the speed of data transmission has become increasingly more important. Although current technologies provide improved speeds as compared to their predecessors, further developments are needed.

BRIEF SUMMARY

One aspect of the present disclosure relates to a system for alerting a user device based on a proposed anonymization of a contribution to a conversation thread via one or several location-based anonymization rules. The system includes a user device including: location determining-features that can determine a physical location of the user device; a network interface that can exchange data with a server via a communication network; and an I/O subsystem that can convert electrical signals to user-interpretable outputs in a user interface. The system can include a server that can: receive a contribution from the user device, which contribution includes content for placement in a conversation thread; and determine an anonymization level for applying to the contribution. In some embodiments, determining the anonymization level includes: receiving physical location information from the user device, which physical location information identifies the physical location of the user device; retrieving an anonymization table from a content access database; and extracting level data from the anonymization table based on the physical location information of the user device, which level data includes the anonymization level. The server can: identify a potential identifier in the content of the contribution; anonymize the potential identifier according to the determined anonymization level; and generate and provide an alert to the user device, which alert includes code to direct the user device to provide an indicator of the received alert via the I/O subsystem.

In some embodiments, the indicator of the received alert includes: an aural indicator; a tactile indicator; and a visual indicator. In some embodiments, the contribution includes contribution data identifying the originator of the contribution. In some embodiments, the server can determine an active location of the originator of the contribution, which active location is based on the physical location and a membership of the user. In some embodiments, extracting level data from the anonymization table is based on the physical location information of the user device and the active location of the user.

In some embodiments, the server can retrieve anonymization rules corresponding to the anonymization level. In some embodiments, the location-determining features include a Global Positioning System receiver and a Global Positioning System antenna. In some embodiments, the server can identify the potential identifier as an actual identifier when the potential identifier matches user data and when the potential identifier does not match group materials. In some embodiments, the server can identify the potential identifier as not an actual identifier when the potential identifier does not match user data. In some embodiments, the server can identify the potential identifier as not an actual identifier when the potential identifier matches user data, when the potential identifier matches group materials, and when the potential identifier is associated with the group materials. In some embodiments, identifying the potential identifier as not an actual identifier when the potential identifier matches user data, when the potential identifier matches group materials, and when the potential identifier is associated with the group materials includes: identifying a window size for evaluation, which window size specifies an amount of data surrounding the potential identifier for analysis; identifying data within the window; analyzing the data within the window; and outputting an indicator of association between the potential identifier and the group materials.

One aspect of the present disclosure relates to a method for alerting a user device based on a proposed anonymization of a contribution to a conversation thread via one or several location-based anonymization rules. The method includes: receiving at a server a contribution from a user device via a communication network, which contribution includes content for placement in a conversation thread; and determining with the server an anonymization level for applying to the contribution. In some embodiments, determining the anonymization level includes: receiving physical location information from the user device, which physical location information identifies a physical location of the user device; retrieving an anonymization table from a content access database; and extracting level data from the anonymization table based on the physical location information of the user device, which level data includes the anonymization level. In some embodiments, the method includes identifying with the server a potential identifier in the content of the contribution; anonymizing with the server the potential identifier according to the determined anonymization level; and generating and providing an alert to the user device via the communication network. In some embodiments, the alert includes code to direct the user device to provide an indicator of the received alert via an I/O subsystem configured to convert electrical signals to user-interpretable outputs in a user interface.

In some embodiments, the indicator of the received alert includes: an aural indicator; a tactile indicator; and a visual indicator. In some embodiments, the contribution includes contribution data identifying the originator of the contribution. In some embodiments the method includes determining an active location of the originator of the contribution, which active location is based on the physical location and a membership of the user. In some embodiments, extracting level data from the anonymization table is based on the physical location information of the user device and the active location of the user.

In some embodiments, the method includes retrieving anonymization rules corresponding to the anonymization level. In some embodiments, the location information is generated by location-determining features of the user device. In some embodiments, the location-determining features include a Global Positioning System receiver and a Global Positioning System antenna. In some embodiments, the method includes identifying the potential identifier as an actual identifier when the potential identifier matches user data and when the potential identifier does not match group materials.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides illustrative embodiment(s) only and is not intended to limit the scope, applicability or configuration of the disclosure. Rather, the ensuing description of the illustrative embodiment(s) will provide those skilled in the art with an enabling description for implementing a preferred exemplary embodiment. It is understood that various changes can be made in the function and arrangement of elements without departing from the spirit and scope as set forth in the appended claims.

Figure 1:
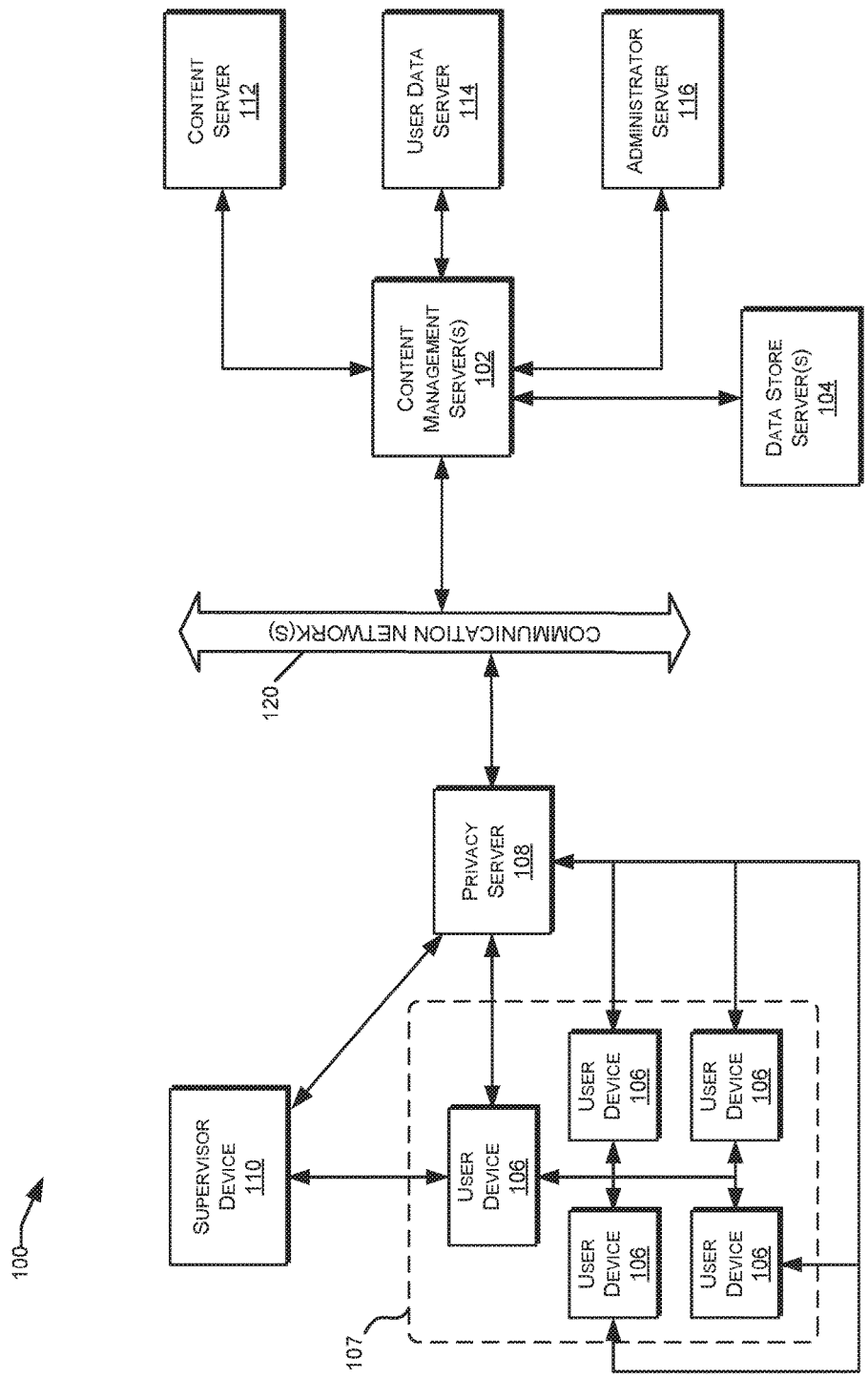
FIG. 1 is a block diagram illustrating an example of a content distribution network.

With reference now to FIG. 1, a block diagram is shown illustrating various components of a content distribution network (CDN) 100 which implements and supports certain embodiments and features described herein. Content distribution network 100 may include one or more content management servers 102. As discussed below in more detail, content management servers 102 may be any desired type of server including, for example, a rack server, a tower server, a miniature server, a blade server, a mini rack server, a mobile server, an ultra-dense server, a super server, or the like, and may include various hardware components, for example, a motherboard, processing units, memory systems, hard drives, network interfaces, power supplies, etc. Content management server 102 may include one or more server farms, clusters, or any other appropriate arrangement and/or combination or computer servers. Content management server 102 may act according to stored instructions located in a memory subsystem of the server 102, and may run an operating system, including any commercially available server operating system and/or any other operating systems discussed herein.

The content distribution network 100 may include one or more data store servers 104, such as database servers and file-based storage systems. The database servers 104 can access data that can be stored on a variety of hardware components. These hardware components can include, for example, components forming tier 0 storage, components forming tier 1 storage, components forming tier 2 storage, and/or any other tier of storage. In some embodiments, tier 0 storage refers to storage that is the fastest tier of storage in the database server 104, and particularly, the tier 0 storage is the fastest storage that is not RAM or cache memory. In some embodiments, the tier 0 memory can be embodied in solid state memory such as, for example, a solid-state drive (SSD) and/or flash memory.

In some embodiments, the tier 1 storage refers to storage that is one or several higher performing systems in the memory management system, and that is relatively slower than tier 0 memory, and relatively faster than other tiers of memory. The tier 1 memory can be one or several hard disks that can be, for example, high-performance hard disks. These hard disks can be one or both of physically or communicatingly connected such as, for example, by one or several fiber channels. In some embodiments, the one or several disks can be arranged into a disk storage system, and specifically can be arranged into an enterprise class disk storage system. The disk storage system can include any desired level of redundancy to protect data stored therein, and in one embodiment, the disk storage system can be made with grid architecture that creates parallelism for uniform allocation of system resources and balanced data distribution.

In some embodiments, the tier 2 storage refers to storage that includes one or several relatively lower performing systems in the memory management system, as compared to the tier 1 and tier 2 storages. Thus, tier 2 memory is relatively slower than tier 1 and tier 0 memories. Tier 2 memory can include one or several SATA-drives or one or several NL-SATA drives.

In some embodiments, the one or several hardware and/or software components of the database server 104 can be arranged into one or several storage area networks (SAN), which one or several storage area networks can be one or several dedicated networks that provide access to data storage, and particularly that provide access to consolidated, block level data storage. A SAN typically has its own network of storage devices that are generally not accessible through the local area network (LAN) by other devices. The SAN allows access to these devices in a manner such that these devices appear to be locally attached to the user device.

Data stores 104 may comprise stored data relevant to the functions of the content distribution network 100. Illustrative examples of data stores 104 that may be maintained in certain embodiments of the content distribution network 100 are described below in reference to FIG. 3. In some embodiments, multiple data stores may reside on a single server 104, either using the same storage components of server 104 or using different physical storage components to assure data security and integrity between data stores. In other embodiments, each data store may have a separate dedicated data store server 104.

Content distribution network 100 also may include one or more user devices 106 and/or supervisor devices 110. User devices 106 and supervisor devices 110 may display content received via the content distribution network 100, and may support various types of user interactions with the content. User devices 106 and supervisor devices 110 may include mobile devices such as smartphones, tablet computers, personal digital assistants, and wearable computing devices. Such mobile devices may run a variety of mobile operating systems, and may be enabled for Internet, e-mail, short message service (SMS), Bluetooth®, mobile radio-frequency identification (M-RFID), and/or other communication protocols. Other user devices 106 and supervisor devices 110 may be general purpose personal computers or special-purpose computing devices including, by way of example, personal computers, laptop computers, workstation computers, projection devices, and interactive room display systems. Additionally, user devices 106 and supervisor devices 110 may be any other electronic devices, such as a thin-client computers, an Internet-enabled gaming systems, business or home appliances, and/or a personal messaging devices, capable of communicating over network(s) 120.

In different contexts of content distribution networks 100, user devices 106 and supervisor devices 110 may correspond to different types of specialized devices, for example, student devices and teacher devices in an educational network, employee devices and presentation devices in a company network, different gaming devices in a gaming network, etc. In some embodiments, user devices 106 and supervisor devices 110 may operate in the same physical location 107, such as a classroom or conference room. In such cases, the devices may contain components that support direct communications with other nearby devices, such as a wireless transceivers and wireless communications interfaces, Ethernet sockets or other Local Area Network (LAN) interfaces, etc. In other implementations, the user devices 106 and supervisor devices 110 need not be used at the same location 107, but may be used in remote geographic locations in which each user device 106 and supervisor device 110 may use security features and/or specialized hardware (e.g., hardware-accelerated SSL and HTTPS, WS-Security, firewalls, etc.) to communicate with the content management server 102 and/or other remotely located user devices 106. Additionally, different user devices 106 and supervisor devices 110 may be assigned different designated roles, such as presenter devices, teacher devices, administrator devices, or the like, and in such cases the different devices may be provided with additional hardware and/or software components to provide content and support user capabilities not available to the other devices.

The content distribution network 100 also may include a privacy server 108 that maintains private user information at the privacy server 108 while using applications or services hosted on other servers. For example, the privacy server 108 may be used to maintain private data of a user within one jurisdiction even though the user is accessing an application hosted on a server (e.g., the content management server 102) located outside the jurisdiction. In such cases, the privacy server 108 may intercept communications between a user device 106 or supervisor device 110 and other devices that include private user information. The privacy server 108 may create a token or identifier that does not disclose the private information and may use the token or identifier when communicating with the other servers and systems, instead of using the user's private information.

As illustrated in FIG. 1, the content management server 102 may be in communication with one or more additional servers, such as a content server 112, a user data server 114, and/or an administrator server 116. Each of these servers may include some or all of the same physical and logical components as the content management server(s) 102, and in some cases, the hardware and software components of these servers 112-116 may be incorporated into the content management server(s) 102, rather than being implemented as separate computer servers.

Content server 112 may include hardware and software components to generate, store, and maintain the content resources for distribution to user devices 106 and other devices in the network 100. For example, in content distribution networks 100 used for professional training and educational purposes, content server 112 may include data stores of training materials, presentations, plans, syllabi, reviews, evaluations, interactive programs and simulations, course models, course outlines, and various training interfaces that correspond to different materials and/or different types of user devices 106. In content distribution networks 100 used for media distribution, interactive gaming, and the like, a content server 112 may include media content files such as music, movies, television programming, games, and advertisements.

User data server 114 may include hardware and software components that store and process data for multiple users relating to each user's activities and usage of the content distribution network 100. For example, the content management server 102 may record and track each user's system usage, including their user device 106, content resources accessed, and interactions with other user devices 106. This data may be stored and processed by the user data server 114, to support user tracking and analysis features. For instance, in the professional training and educational contexts, the user data server 114 may store and analyze each user's training materials viewed, presentations attended, courses completed, interactions, evaluation results, and the like. The user data server 114 may also include a repository for user-generated material, such as evaluations and tests completed by users, and documents and assignments prepared by users. In the context of media distribution and interactive gaming, the user data server 114 may store and process resource access data for multiple users (e.g., content titles accessed, access times, data usage amounts, gaming histories, user devices and device types, etc.).

Administrator server 116 may include hardware and software components to initiate various administrative functions at the content management server 102 and other components within the content distribution network 100. For example, the administrator server 116 may monitor device status and performance for the various servers, data stores, and/or user devices 106 in the content distribution network 100. When necessary, the administrator server 116 may add or remove devices from the network 100, and perform device maintenance such as providing software updates to the devices in the network 100. Various administrative tools on the administrator server 116 may allow authorized users to set user access permissions to various content resources, monitor resource usage by users and devices 106, and perform analyses and generate reports on specific network users and/or devices (e.g., resource usage tracking reports, training evaluations, etc.).

The content distribution network 100 may include one or more communication networks 120. Although only a single network 120 is identified in FIG. 1, the content distribution network 100 may include any number of different communication networks between any of the computer servers and devices shown in FIG. 1 and/or other devices described herein. Communication networks 120 may enable communication between the various computing devices, servers, and other components of the content distribution network 100. As discussed below, various implementations of content distribution networks 100 may employ different types of networks 120, for example, computer networks, telecommunications networks, wireless networks, and/or any combination of these and/or other networks.

Figure 2:
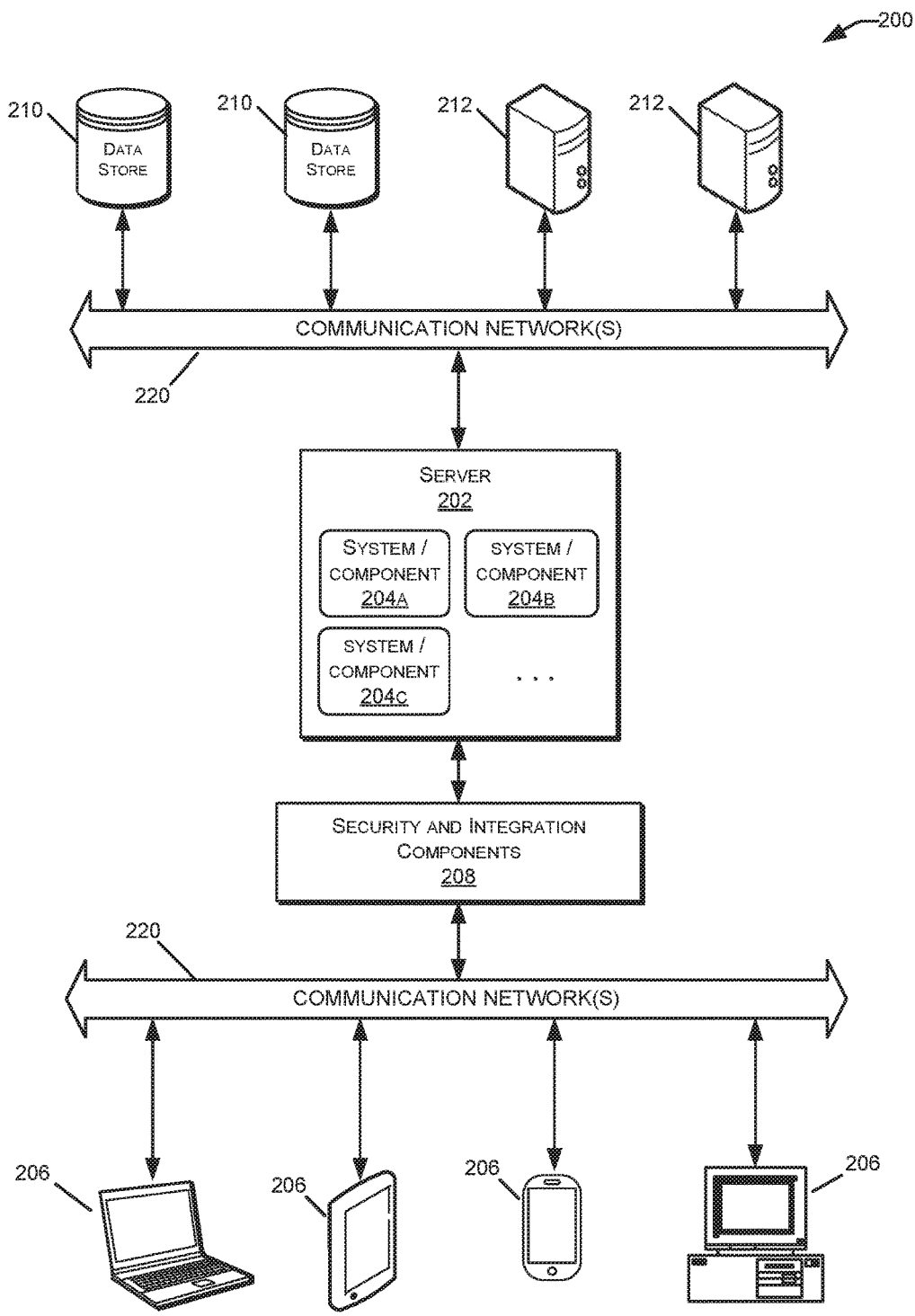
FIG. 2 is a block diagram illustrating a computer server and computing environment within a content distribution network.

With reference to FIG. 2, an illustrative distributed computing environment 200 is shown, including a computer server 202, four client computing devices 206, and other components that may implement certain embodiments and features described herein. In some embodiments, the server 202 may correspond to the content management server 102 discussed above in FIG. 1, and the client computing devices 206 may correspond to the user devices 106. However, the computing environment 200 illustrated in FIG. 2 may correspond to any other combination of devices and servers configured to implement a client-server model or other distributed computing architecture.

Client devices 206 may be configured to receive and execute client applications over one or more networks 220. Such client applications may be web browser-based applications and/or standalone software applications, such as mobile device applications. Server 202 may be communicatively coupled with the client devices 206 via one or more communication networks 220. Client devices 206 may receive client applications from server 202 or from other application providers (e.g., public or private application stores). Server 202 may be configured to run one or more server software applications or services, for example, web-based or cloud-based services, to support content distribution and interaction with client devices 206. Users operating client devices 206 may in turn utilize one or more client applications (e.g., virtual client applications) to interact with server 202 to utilize the services provided by these components.

Various different subsystems and/or components 204A-C may be implemented on server 202. Users operating the client devices 206 may initiate one or more client applications to use services provided by these subsystems and components. The subsystems and components within the server 202 and client devices 206 may be implemented in hardware, firmware, software, or combinations thereof. Various different system configurations are possible in different distributed computing systems 200 and content distribution networks 100. The embodiment shown in FIG. 2 is thus one example of a distributed computing system and is not intended to be limiting.

Although exemplary computing environment 200 is shown with four client computing devices 206, any number of client computing devices may be supported. Other devices, such as specialized sensor devices, etc., may interact with client devices 206 and/or server 202.

As shown in FIG. 2, various security and integration components 208 may be used to send and manage communications between the server 202 and user devices 206 over one or more communication networks 220. The security and integration components 208 may include separate servers, such as web servers and/or authentication servers, and/or specialized networking components, such as firewalls, routers, gateways, load balancers, and the like. In some cases, the security and integration components 208 may correspond to a set of dedicated hardware and/or software operating at the same physical location and under the control of same entities as server 202. For example, components 208 may include one or more dedicated web servers and network hardware in a datacenter or a cloud infrastructure. In other examples, the security and integration components 208 may correspond to separate hardware and software components which may be operated at a separate physical location and/or by a separate entity.

Security and integration components 208 may implement various security features for data transmission and storage, such as authenticating users and restricting access to unknown or unauthorized users. In various implementations, security and integration components 208 may provide, for example, a file-based integration scheme or a service-based integration scheme for transmitting data between the various devices in the content distribution network 100. Security and integration components 208 also may use secure data transmission protocols and/or encryption for data transfers, for example, File Transfer Protocol (FTP), Secure File Transfer Protocol (SFTP), and/or Pretty Good Privacy (PGP) encryption.

In some embodiments, one or more web services may be implemented within the security and integration components 208 and/or elsewhere within the content distribution network 100. Such web services, including cross-domain and/or cross-platform web services, may be developed for enterprise use in accordance with various web service standards, such as RESTful web services (i.e., services based on the Representation State Transfer (REST) architectural style and constraints), and/or web services designed in accordance with the Web Service Interoperability (WS-I) guidelines. Some web services may use the Secure Sockets Layer (SSL) or Transport Layer Security (TLS) protocol to provide secure connections between the server 202 and user devices 206. SSL or TLS may use HTTP or HTTPS to provide authentication and confidentiality. In other examples, web services may be implemented using REST over HTTPS with the OAuth open standard for authentication, or using the WS-Security standard which provides for secure SOAP messages using XML encryption. In other examples, the security and integration components 208 may include specialized hardware for providing secure web services. For example, security and integration components 208 may include secure network appliances having built-in features such as hardware-accelerated SSL and HTTPS, WS-Security, and firewalls. Such specialized hardware may be installed and configured in front of any web servers, so that any external devices may communicate directly with the specialized hardware.

Communication network(s) 220 may be any type of network familiar to those skilled in the art that can support data communications using any of a variety of commercially-available protocols, including without limitation, TCP/IP (transmission control protocol/Internet protocol), SNA (systems network architecture), IPX (Internet packet exchange), Secure Sockets Layer (SSL) or Transport Layer Security (TLS) protocols, Hyper Text Transfer Protocol (HTTP) and Secure Hyper Text Transfer Protocol (HTTPS), Bluetooth®, Near Field Communication (NFC), and the like. Merely by way of example, network(s) 220 may be local area networks (LAN), such as one based on Ethernet, Token-Ring and/or the like. Network(s) 220 also may be wide-area networks, such as the Internet. Networks 220 may include telecommunication networks such as a public switched telephone networks (PSTNs), or virtual networks such as an intranet or an extranet. Infrared and wireless networks (e.g., using the Institute of Electrical and Electronics (IEEE) 802.11 protocol suite or other wireless protocols) also may be included in networks 220.

Computing environment 200 also may include one or more data stores 210 and/or back-end servers 212. In certain examples, the data stores 210 may correspond to data store server(s) 104 discussed above in FIG. 1, and back-end servers 212 may correspond to the various back-end servers 112-116. Data stores 210 and servers 212 may reside in the same datacenter or may operate at a remote location from server 202. In some cases, one or more data stores 210 may reside on a non-transitory storage medium within the server 202. Other data stores 210 and back-end servers 212 may be remote from server 202 and configured to communicate with server 202 via one or more networks 220. In certain embodiments, data stores 210 and back-end servers 212 may reside in a storage-area network (SAN), or may use storage-as-a-service (STaaS) architectural model.

Figure 3:
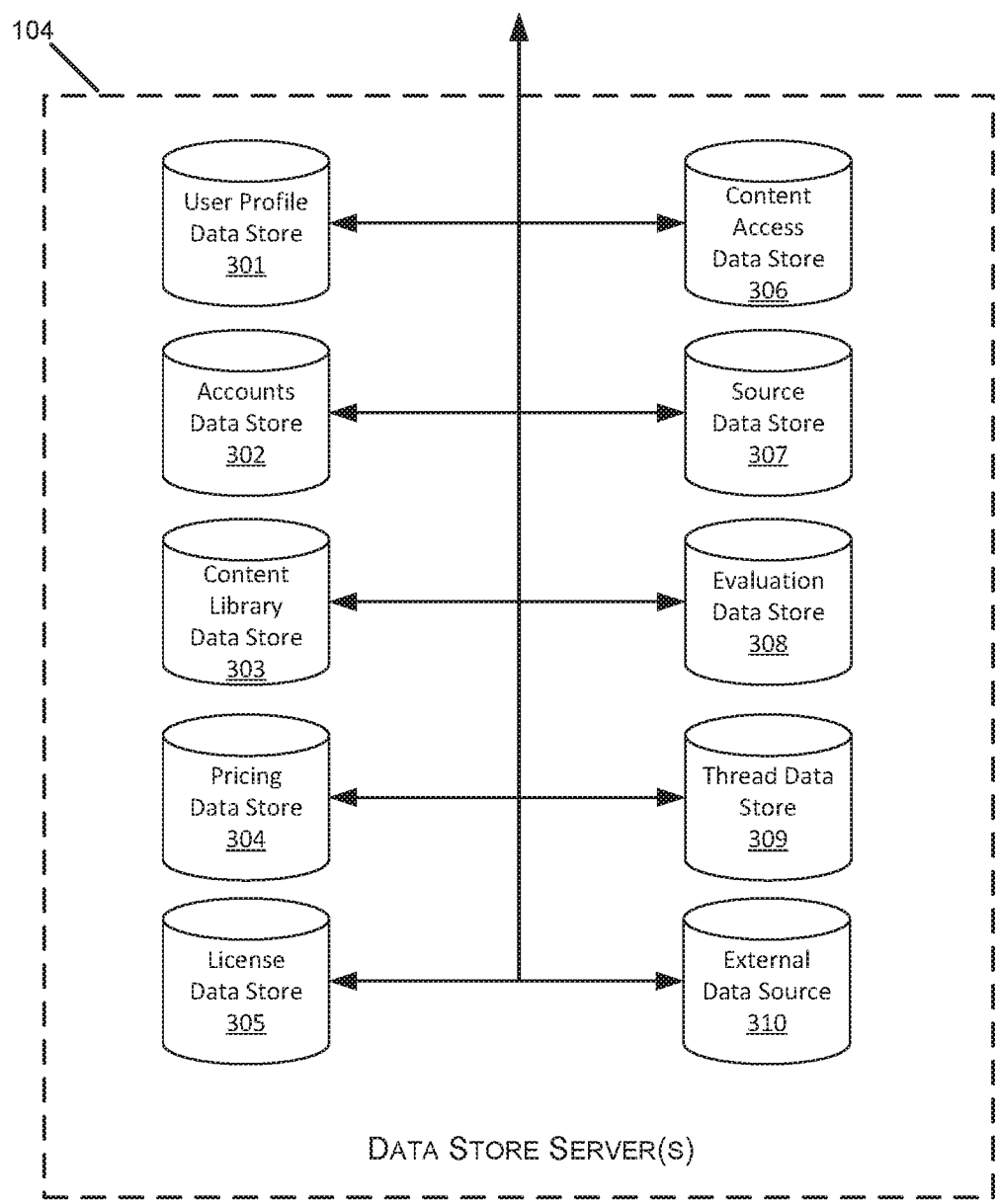
FIG. 3 is a block diagram illustrating an embodiment of one or more data store servers within a content distribution network.

With reference to FIG. 3, an illustrative set of data stores and/or data store servers is shown, corresponding to the data store servers 104 of the content distribution network 100 discussed above in FIG. 1. One or more individual data stores 301-310 may reside in storage on a single computer server 104 (or a single server farm or cluster) under the control of a single entity, or may reside on separate servers operated by different entities and/or at remote locations. In some embodiments, data stores 301-310 may be accessed by the content management server 102 and/or other devices and servers within the network 100 (e.g., user devices 106, supervisor devices 110, administrator servers 116, etc.). Access to one or more of the data stores 301-310 may be limited or denied based on the processes, user credentials, and/or devices attempting to interact with the data store.

The paragraphs below describe examples of specific data stores that may be implemented within some embodiments of a content distribution network 100. It should be understood that the below descriptions of data stores 301-310, including their functionality and types of data stored therein, are illustrative and non-limiting. Data store server architecture, and design, and the execution of specific data stores 301-310 may depend on the context, size, and functional requirements of a content distribution network 100. For example, in content distribution systems 100 used for professional training and educational purposes, separate databases or file-based storage systems may be implemented in data store server(s) 104 to store trainee and/or student data, trainer and/or professor data, training module data and content descriptions, training results, evaluation data, and the like. In contrast, in content distribution systems 100 used for media distribution from content providers to subscribers, separate data stores may be implemented in data stores server(s) 104 to store listings of available content titles and descriptions, content title usage statistics, subscriber profiles, account data, payment data, network usage statistics, etc.

A user profile data store 301, also referred to herein as a user profile database 301, may include information relating to the end users within the content distribution network 100. This information may include user characteristics such as the user names, access credentials (e.g., logins and passwords), user preferences, and information relating to any previous user interactions within the content distribution network 100 (e.g., requested content, posted content, content modules completed, training scores or evaluations, other associated users, etc.). In some embodiments, this information can relate to one or several individual end users such as, for example, one or several students, teachers, administrators, or the like, and in some embodiments, this information can relate to one or several institutional end users such as, for example, one or several schools, groups of schools such as one or several school districts, one or several colleges, one or several universities, one or several training providers, or the like. In some embodiments, this information can identify one or several user memberships in one or several groups such as, for example, a student's membership in a university, school, program, grade, course, class, or the like.

In some embodiments in which the one or several end users are individuals, and specifically are students, the user profile database 301 can further include information relating to these students' academic and/or educational history. This information can identify one or several courses of study that the student has initiated, completed, and/or partially completed, as well as grades received in those courses of study. In some embodiments, the student's academic and/or educational history can further include information identifying student performance on one or several tests, quizzes, and/or assignments. In some embodiments, this information can be stored in a tier of memory that is not the fastest memory in the content delivery network 100.

The user profile database 301 can include information relating to one or several student learning preferences. In some embodiments, for example, the student may have one or several preferred learning styles, one or several most effective learning styles, and/or the like. In some embodiments, the students learning style can be any learning style describing how the student best learns or how the student prefers to learn. In one embodiment, these learning styles can include, for example, identification of the student as an auditory learner, as a visual learner, and/or as a tactile learner. In some embodiments, the data identifying one or several student learning styles can include data identifying a learning style based on the student's educational history such as, for example, identifying a student as an auditory learner when the student has received significantly higher grades and/or scores on assignments and/or in courses favorable to auditory learners. In some embodiments, this information can be stored in a tier of memory that is not the fastest memory in the content delivery network 100.

The user profile database 301 can further include information relating to one or several teachers and/or instructors who are responsible for organizing, presenting, and/or managing the presentation of information to the student. In some embodiments, user profile database 301 can include information identifying courses and/or subjects that have been taught by the teacher, data identifying courses and/or subjects currently taught by the teacher, and/or data identifying courses and/or subjects that will be taught by the teacher. In some embodiments, this can include information relating to one or several teaching styles of one or several teachers. In some embodiments, the user profile database 301 can further include information indicating past evaluations and/or evaluation reports received by the teacher. In some embodiments, the user profile database 301 can further include information relating to improvement suggestions received by the teacher, training received by the teacher, continuing education received by the teacher, and/or the like. In some embodiments, this information can be stored in a tier of memory that is not the fastest memory in the content delivery network 100.

An accounts data store 302, also referred to herein as an accounts database 302, may generate and store account data for different users in various roles within the content distribution network 100. For example, accounts may be created in an accounts data store 302 for individual end users, supervisors, administrator users, and entities such as companies or educational institutions. Account data may include account types, current account status, account characteristics, and any parameters, limits, restrictions associated with the accounts.

A content library data store 303, also referred to herein as a content library database 303, may include information describing the individual content items (or content resources) available via the content distribution network 100. In some embodiments, the library data store 303 may include metadata, properties, and other characteristics associated with the content resources stored in the content server 112. Such data may identify one or more aspects or content attributes of the associated content resources, for example, subject matter, access level, or skill level of the content resources, license attributes of the content resources (e.g., any limitations and/or restrictions on the licensable use and/or distribution of the content resource), price attributes of the content resources (e.g., a price and/or price structure for determining a payment amount for use or distribution of the content resource), rating attributes for the content resources (e.g., data indicating the evaluation or effectiveness of the content resource), and the like. In some embodiments, the library data store 303 may be configured to allow updating of content metadata or properties, and to allow the addition and/or removal of information relating to the content resources. For example, content relationships may be implemented as graph structures, which may be stored in the library data store 303 or in an additional store for use by selection algorithms along with the other metadata.

A pricing data store 304 may include pricing information and/or pricing structures for determining payment amounts for providing access to the content distribution network 100 and/or the individual content resources within the network 100. In some cases, pricing may be determined based on a user's access to the content distribution network 100, for example, a time-based subscription fee, or pricing based on network usage. In other cases, pricing may be tied to specific content resources. Certain content resources may have associated pricing information, whereas other pricing determinations may be based on the resources accessed, the profiles and/or accounts of the user, and the desired level of access (e.g., duration of access, network speed, etc.). Additionally, the pricing data store 304 may include information relating to compilation pricing for groups of content resources, such as group prices and/or price structures for groupings of resources.

A license data store 305 may include information relating to licenses and/or licensing of the content resources within the content distribution network 100. For example, the license data store 305 may identify licenses and licensing terms for individual content resources and/or compilations of content resources in the content server 112, the rights holders for the content resources, and/or common or large-scale right holder information such as contact information for rights holders of content not included in the content server 112.

A content access data store 306 may include access rights and security information for the content distribution network 100 and specific content resources. For example, the content access data store 306 may include login information (e.g., user identifiers, logins, passwords, etc.) that can be verified during user login attempts to the network 100. The content access data store 306 also may be used to store assigned user roles and/or user levels of access. For example, a user's access level may correspond to the sets of content resources and/or the client or server applications that the user is permitted to access. Certain users may be permitted or denied access to certain applications and resources based on their subscription level, training program, course/grade level, etc. Certain users may have supervisory access over one or more end users, allowing the supervisor to access all or portions of the end user's content, activities, evaluations, etc. Additionally, certain users may have administrative access over some users and/or some applications in the content management network 100, allowing such users to add and remove user accounts, modify user access permissions, perform maintenance updates on software and servers, etc.

A source data store 307 may include information relating to the source of the content resources available via the content distribution network. For example, a source data store 307 may identify the authors and originating devices of content resources, previous pieces of data and/or groups of data originating from the same authors or originating devices, and the like.

An evaluation data store 308 may include information used to direct the evaluation of users and content resources in the content management network 100. In some embodiments, the evaluation data store 308 may contain, for example, the analysis criteria and the analysis guidelines for evaluating users (e.g., trainees/students, gaming users, media content consumers, etc.) and/or for evaluating the content resources in the network 100. The evaluation data store 308 also may include information relating to evaluation processing tasks, for example, the identification of users and user devices 106 that have received certain content resources or accessed certain applications, the status of evaluations or evaluation histories for content resources, users, or applications, and the like. Evaluation criteria may be stored in the evaluation data store 308 including data and/or instructions in the form of one or several electronic rubrics or scoring guides for use in the evaluation of the content, users, or applications. The evaluation data store 308 also may include past evaluations and/or evaluation analyses for users, content, and applications, including relative rankings, characterizations, explanations, and the like.

A thread data store 309, also referred to herein as a thread database 309 can include information relating to one or several conversation threads, which can each include one or several user posts. In some embodiments, the thread data store 309 can include thread information identifying, for example, the number of users that can access a thread, the access level(s) of the users that can access a thread including, for example, a read-only access level, a read-write access level, or the like. In some embodiments, the thread information can include thread metadata that can identify one or several aspects of the thread including, for example, thread content, post or comment information, or the like. In some embodiments, the thread information can include thread user data that can track one or several user interactions with the thread such as, for example, user posts to the thread, metadata of user posts to the thread, activity level in the thread, or the like.

In addition to the illustrative data stores described above, data store server(s) 104 (e.g., database servers, file-based storage servers, etc.) may include one or more external data aggregators 310. External data aggregators 310 may include third-party data sources accessible to the content management network 100, but not maintained by the content management network 100. External data aggregators 310 may include any electronic information source relating to the users, content resources, or applications of the content distribution network 100. For example, external data aggregators 310 may be third-party data stores containing demographic data, education related data, 310 sales data, health related data, and the like. Illustrative external data aggregators 310 may include, for example, social networking web servers, public records data stores, learning management systems, educational institution servers, business servers, consumer sales data stores, medical record data stores, etc. Data retrieved from various external data aggregators 310 may be used to verify and update user account information, suggest user content, and perform user and content evaluations.

Figure 4:
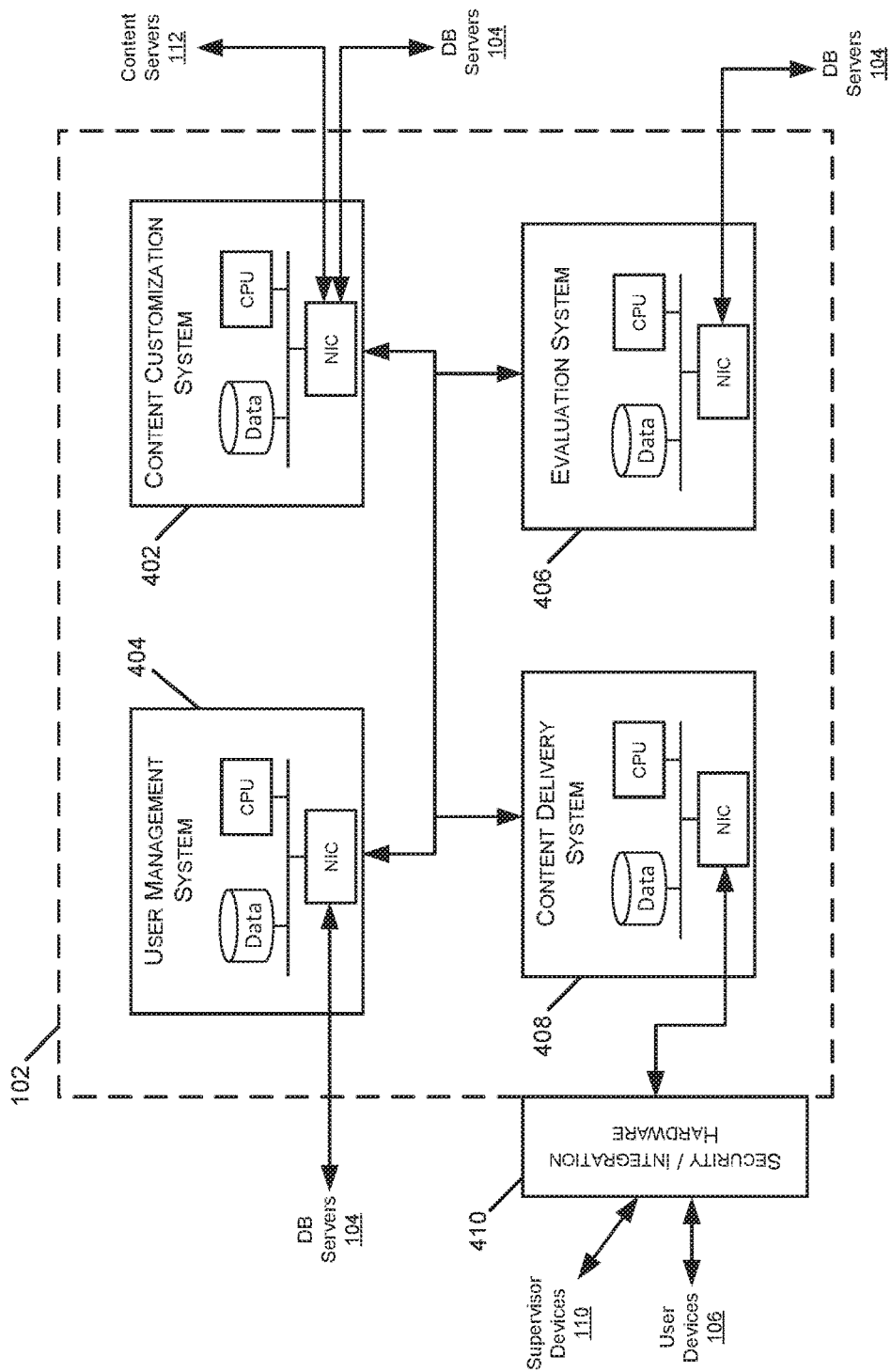
FIG. 4 is a block diagram illustrating an embodiment of one or more content management servers within a content distribution network.

With reference now to FIG. 4, a block diagram is shown illustrating an embodiment of one or more content management servers 102 within a content distribution network 100. As discussed above, content management server(s) 102 may include various server hardware and software components that manage the content resources within the content distribution network 100 and provide interactive and adaptive content to users on various user devices 106. For example, content management server(s) 102 may provide instructions to send and receive information from the other devices within the content distribution network 100, in order to manage and transmit content resources, user data, and server or client applications executing within the network 100.

A content management server 102 may include a content customization system 402. The content customization system 402 may be implemented using dedicated hardware within the content distribution network 100 (e.g., a content customization server 402), or using designated hardware and software resources within a shared content management server 102. In some embodiments, the content customization system 402 may adjust the selection and adaptive capabilities of content resources to match the needs and desires of the users receiving the content. For example, the content customization system 402 may query various data stores and servers 104 to retrieve user information, such as user preferences and characteristics (e.g., from a user profile data store 301), user access restrictions to content recourses (e.g., from a content access data store 306), previous user results and content evaluations (e.g., from an evaluation data store 308), and the like. Based on the retrieved information from data stores 104 and other data sources, the content customization system 402 may modify content resources for individual users.

A content management server 102 also may include a user management system 404. The user management system 404 may be implemented using dedicated hardware within the content distribution network 100 (e.g., a user management server 404), or using designated hardware and software resources within a shared content management server 102. In some embodiments, the user management system 404 may monitor the progress of users through various types of content resources and groups, such as media compilations, courses or curriculums in training or educational contexts, interactive gaming environments, and the like. For example, the user management system 404 may query one or more databases and/or data store servers 104 to retrieve user data such as associated content compilations or programs, content completion status, user goals, results, and the like.

A content management server 102 also may include an evaluation system 406. The evaluation system 406 may be implemented using dedicated hardware within the content distribution network 100 (e.g., an evaluation server 406), or using designated hardware and software resources within a shared content management server 102. The evaluation system 406 may be configured to receive and analyze information from user devices 106. For example, various ratings of content resources submitted by users may be compiled and analyzed, and then stored in a data store (e.g., a content library data store 303 and/or evaluation data store 308) associated with the content. In some embodiments, the evaluation server 406 may analyze the information to determine the effectiveness or appropriateness of content resources with, for example, a subject matter, an age group, a skill level, or the like. In some embodiments, the evaluation system 406 may provide updates to the content customization system 402 or the user management system 404, with the attributes of one or more content resources or groups of resources within the network 100. The evaluation system 406 also may receive and analyze user evaluation data from user devices 106, supervisor devices 110, and administrator servers 116, etc. For instance, evaluation system 406 may receive, aggregate, and analyze user evaluation data for different types of users (e.g., end users, supervisors, administrators, etc.) in different contexts (e.g., media consumer ratings, trainee or student comprehension levels, teacher effectiveness levels, gamer skill levels, etc.).

A content management server 102 also may include a content delivery system 408. The content delivery system 408 may be implemented using dedicated hardware within the content distribution network 100 (e.g., a content delivery server 408), or using designated hardware and software resources within a shared content management server 102. The content delivery system 408 may receive content resources from the content customization system 402 and/or from the user management system 404, and provide the resources to user devices 106. The content delivery system 408 may determine the appropriate presentation format for the content resources based on the user characteristics and preferences, and/or the device capabilities of user devices 106. If needed, the content delivery system 408 may convert the content resources to the appropriate presentation format and/or compress the content before transmission. In some embodiments, the content delivery system 408 may also determine the appropriate transmission media and communication protocols for transmission of the content resources.

In some embodiments, the content delivery system 408 may include specialized security and integration hardware 410, along with corresponding software components to implement the appropriate security features for content transmission and storage, to provide the supported network and client access models, and to support the performance and scalability requirements of the network 100. The security and integration layer 410 may include some or all of the security and integration components 208 discussed above in FIG. 2, and may control the transmission of content resources and other data, as well as the receipt of requests and content interactions, to and from the user devices 106, supervisor devices 110, administrative servers 116, and other devices in the network 100.

Figure 5:
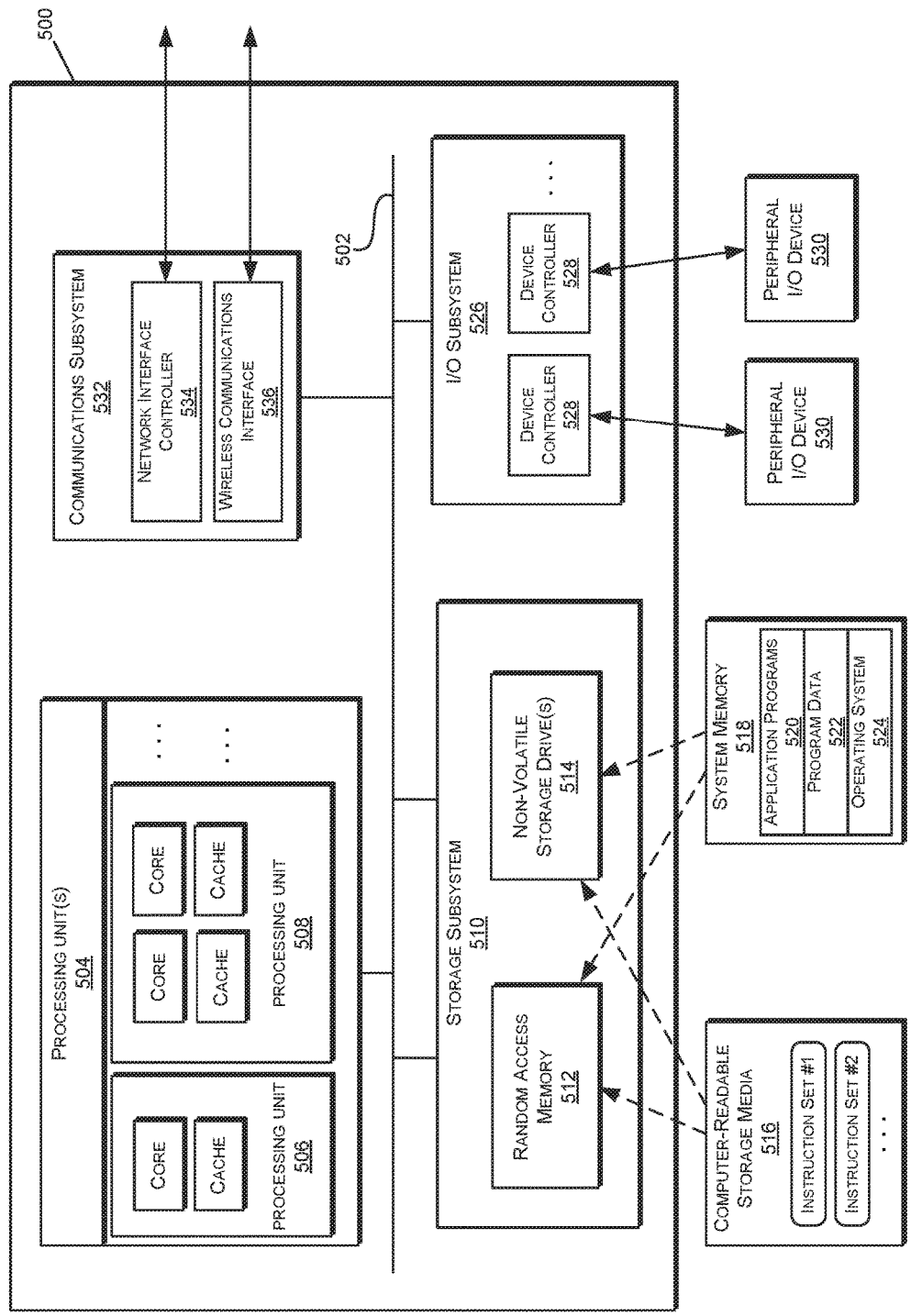
FIG. 5 is a block diagram illustrating the physical and logical components of a special-purpose computer device within a content distribution network.

With reference now to FIG. 5, a block diagram of an illustrative computer system is shown. The system 500 may correspond to any of the computing devices or servers of the content distribution network 100 described above, or any other computing devices described herein, and specifically can include, for example, one or several of the user devices 106, the supervisor device 110, and/or any of the servers 102, 104, 108, 112, 114, 116. In this example, computer system 500 includes processing units 504 that communicate with a number of peripheral subsystems via a bus subsystem 502. These peripheral subsystems include, for example, a storage subsystem 510, an I/O subsystem 526, and a communications subsystem 532.

Bus subsystem 502 provides a mechanism for letting the various components and subsystems of computer system 500 communicate with each other as intended. Although bus subsystem 502 is shown schematically as a single bus, alternative embodiments of the bus subsystem may utilize multiple buses. Bus subsystem 502 may be any of several types of bus structures including a memory bus or memory controller, a peripheral bus, and a local bus using any of a variety of bus architectures. Such architectures may include, for example, an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 504, which may be implemented as one or more integrated circuits (e.g., a conventional microprocessor or microcontroller), controls the operation of computer system 500. One or more processors, including single core and/or multicore processors, may be included in processing unit 504. As shown in the figure, processing unit 504 may be implemented as one or more independent processing units 506 and/or 508 with single or multicore processors and processor caches included in each processing unit. In other embodiments, processing unit 504 may also be implemented as a quad-core processing unit or larger multicore designs (e.g., hexa-core processors, octo-core processors, ten-core processors, or greater).

Processing unit 504 may execute a variety of software processes embodied in program code, and may maintain multiple concurrently executing programs or processes. At any given time, some or all of the program code to be executed can be resident in processor(s) 504 and/or in storage subsystem 510. In some embodiments, computer system 500 may include one or more specialized processors, such as digital signal processors (DSPs), outboard processors, graphics processors, application-specific processors, and/or the like.

I/O subsystem 526 may include device controllers 528 for one or more user interface input devices and/or user interface output devices 530. User interface input and output devices 530 may be integral with the computer system 500 (e.g., integrated audio/video systems, and/or touchscreen displays), or may be separate peripheral devices which are attachable/detachable from the computer system 500. The I/O subsystem 526 may provide one or several outputs to a user by converting one or several electrical signals to user perceptible and/or interpretable form, and may receive one or several inputs from the user by generating one or several electrical signals based on one or several user-caused interactions with the I/O subsystem such as the depressing of a key or button, the moving of a mouse, the interaction with a touchscreen or trackpad, the interaction of a sound wave with a microphone, or the like.

Input devices 530 may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. Input devices 530 may also include three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additional input devices 530 may include, for example, motion sensing and/or gesture recognition devices that enable users to control and interact with an input device through a natural user interface using gestures and spoken commands, eye gesture recognition devices that detect eye activity from users and transform the eye gestures as input into an input device, voice recognition sensing devices that enable users to interact with voice recognition systems through voice commands, medical imaging input devices, MIDI keyboards, digital musical instruments, and the like.

Output devices 530 may include one or more display subsystems, indicator lights, or non-visual displays such as audio output devices, etc. Display subsystems may include, for example, cathode ray tube (CRT) displays, flat-panel devices, such as those using a liquid crystal display (LCD) or plasma display, light-emitting diode (LED) displays, projection devices, touch screens, and the like. In general, use of the term "output device" is intended to include all possible types of devices and mechanisms for outputting information from computer system 500 to a user or other computer. For example, output devices 530 may include, without limitation, a variety of display devices that visually convey text, graphics and audio/video information such as monitors, printers, speakers, headphones, automotive navigation systems, plotters, voice output devices, and modems.

Computer system 500 may comprise one or more storage subsystems 510, comprising hardware and software components used for storing data and program instructions, such as system memory 518 and computer-readable storage media 516. The system memory 518 and/or computer-readable storage media 516 may store program instructions that are loadable and executable on processing units 504, as well as data generated during the execution of these programs.

Depending on the configuration and type of computer system 500, system memory 518 may be stored in volatile memory (such as random access memory (RAM) 512) and/or in non-volatile storage drives 514 (such as read-only memory (ROM), flash memory, etc.) The RAM 512 may contain data and/or program modules that are immediately accessible to and/or presently being operated and executed by processing units 504. In some implementations, system memory 518 may include multiple different types of memory, such as static random access memory (SRAM) or dynamic random access memory (DRAM). In some implementations, a basic input/output system (BIOS), containing the basic routines that help to transfer information between elements within computer system 500, such as during start-up, may typically be stored in the non-volatile storage drives 514. By way of example, and not limitation, system memory 518 may include application programs 520, such as client applications, Web browsers, mid-tier applications, server applications, etc., program data 522, and an operating system 524.

Storage subsystem 510 also may provide one or more tangible computer-readable storage media 516 for storing the basic programming and data constructs that provide the functionality of some embodiments. Software (programs, code modules, instructions) that when executed by a processor provide the functionality described herein may be stored in storage subsystem 510. These software modules or instructions may be executed by processing units 504. Storage subsystem 510 may also provide a repository for storing data used in accordance with the present invention.

Storage subsystem 300 may also include a computer-readable storage media reader that can further be connected to computer-readable storage media 516. Together and, optionally, in combination with system memory 518, computer-readable storage media 516 may comprehensively represent remote, local, fixed, and/or removable storage devices plus storage media for temporarily and/or more permanently containing, storing, transmitting, and retrieving computer-readable information.

Computer-readable storage media 516 containing program code, or portions of program code, may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 500.

By way of example, computer-readable storage media 516 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 516 may include, but is not limited to, Zip® drives, flash memory cards, universal serial bus (USB) flash drives, secure digital (SD) cards, DVD disks, digital video tape, and the like. Computer-readable storage media 516 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 500.

Communications subsystem 532 may provide a communication interface from computer system 500 and external computing devices via one or more communication networks, including local area networks (LANs), wide area networks (WANs) (e.g., the Internet), and various wireless telecommunications networks. As illustrated in FIG. 5, the communications subsystem 532 may include, for example, one or more network interface controllers (NICs) 534, such as Ethernet cards, Asynchronous Transfer Mode NICs, Token Ring NICs, and the like, as well as one or more wireless communications interfaces 536, such as wireless network interface controllers (WNICs), wireless network adapters, and the like. Additionally and/or alternatively, the communications subsystem 532 may include one or more modems (telephone, satellite, cable, ISDN), synchronous or asynchronous digital subscriber line (DSL) units, FireWire® interfaces, USB® interfaces, and the like. Communications subsystem 536 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

The various physical components of the communications subsystem 532 may be detachable components coupled to the computer system 500 via a computer network, a FireWire® bus, or the like, and/or may be physically integrated onto a motherboard of the computer system 500. Communications subsystem 532 also may be implemented in whole or in part by software.

In some embodiments, communications subsystem 532 may also receive input communication in the form of structured and/or unstructured data feeds, event streams, event updates, and the like, on behalf of one or more users who may use or access computer system 500. For example, communications subsystem 532 may be configured to receive data feeds in real-time from users of social networks and/or other communication services, web feeds such as Rich Site Summary (RSS) feeds, and/or real-time updates from one or more third party information sources (e.g., data aggregators 310). Additionally, communications subsystem 532 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 532 may output such structured and/or unstructured data feeds, event streams, event updates, and the like to one or more data stores 104 that may be in communication with one or more streaming data source computers coupled to computer system 500.

Due to the ever-changing nature of computers and networks, the description of computer system 500 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

In some embodiments, the content distribution network 100 can be used to receive, evaluate, anonymize, and/or affect one or several conversation threads. In some embodiments, this action by the content distribution network can be based on a location of a user, which location can be determined by location-determining features including location determining hardware and/or software in a user device 106 such as, for example, GPS receiver components including, for example, a GPS antenna. In some embodiments, this action by the content distribution network can be based off of a lapsed time and/or a current time. In some embodiments, the lapsed time and/or current time can be determined via one or several clocks or timers that can be, for example, located in one or several of the user devices 106 and/or supervisor device 110, and/or in the content management server 102, the data store server 104, and/or the privacy server 108.

In some embodiments, the content distribution network 100 can be used to affect the one or several conversation threads to increase the effectiveness/usefulness of online conversations through tools that can evaluate aspects of one of the conversation threads that can include one or several user posts. These tools can evaluate aspects of one or several user posts, and/or enable evaluation of one or several user posts. In one embodiment, a conversation thread can be evaluated to determine a contributor effect. This can include determining the degree to which a contributor participated in and/or added to the conversation thread. This can further include determining the degree to which the contributors stimulated, stifled, or derailed further conversation and the degree to which the contributor was referenced or cited.

In some embodiments, a contributor effect score can be generated and can be used, in connection with other data, to identify, for example, a user weakness, material weakness, an instructor weakness, and/or a topic weakness. Inversely, the contributor effect score can be generated and can be used in connection with other data to identify, for example, a user strength, the material strength, and instructor strength, and/or a topic strength. In one exemplary embodiment, the contributor effect score can be used to identify one or several conversation threads that have not and/or are not generating activity, or are generating activity that may be unproductive. In such an embodiment, a contributor solution is identified to remedy the identified weakness. This contributor solution can be identified, for example, based on the effect of one or several contributors on past conversation threads. The contributor solution can be implemented and the effect of the contributor solution can be analyzed. Similarly, in some embodiments, and intervention can be identified and, in some embodiments, can be provided to a contributor. In such an embodiment, for example, a contributor having a low contributor effect score can be identified. An intervention can be selected for the contributor based on the results of the parsing and analysis of comments provided by the contributor and of comments provided by others in response the contributor's comments.

In some embodiments, posts within a conversation thread can be analyzed and anonymized. This anonymization can protect the privacy of contributors to the conversation thread. The anonymization can be achieved by retrieving data for participants in the thread, retrieving information for materials relevant to the conversation thread, detecting potential identification data within the conversation thread, and comparing the potential identification information to the participant and the material data.

Potential identification information can be anonymized when it is determined that the potential identification information matches participant data. This potential identification information can include, for example, any data contained in a contribution that can be used to link a contribution to a contributor including, for example, one or several linguistic patterns including, for example, sentence structures typical to a contributor, word selection typical to a contributor, misspelling typical to a contributor, or the like. In some embodiments, such identification information can be extracted from one or several contributions via, for example, stylistic analysis of contribution text, or other known techniques.

In some embodiments, the above discussed actions and processes with respect to a thread or contributions of one or several threads can solve several technical problems. Specifically, the techniques described herein allow faster processing and analysis of threads than current techniques and algorithms. Particularly, the techniques described herein can enable a single user-supervisor to manage large groups of users located at different locations, such as could arise in a classroom environment or a virtual classroom environment and who are communicating via these one or several communications threads due to the speed with which the conversation threads are analyzed and due to the protection of the contributor data in those threads provided by the anonymization disclosed herein.

Figure 6:
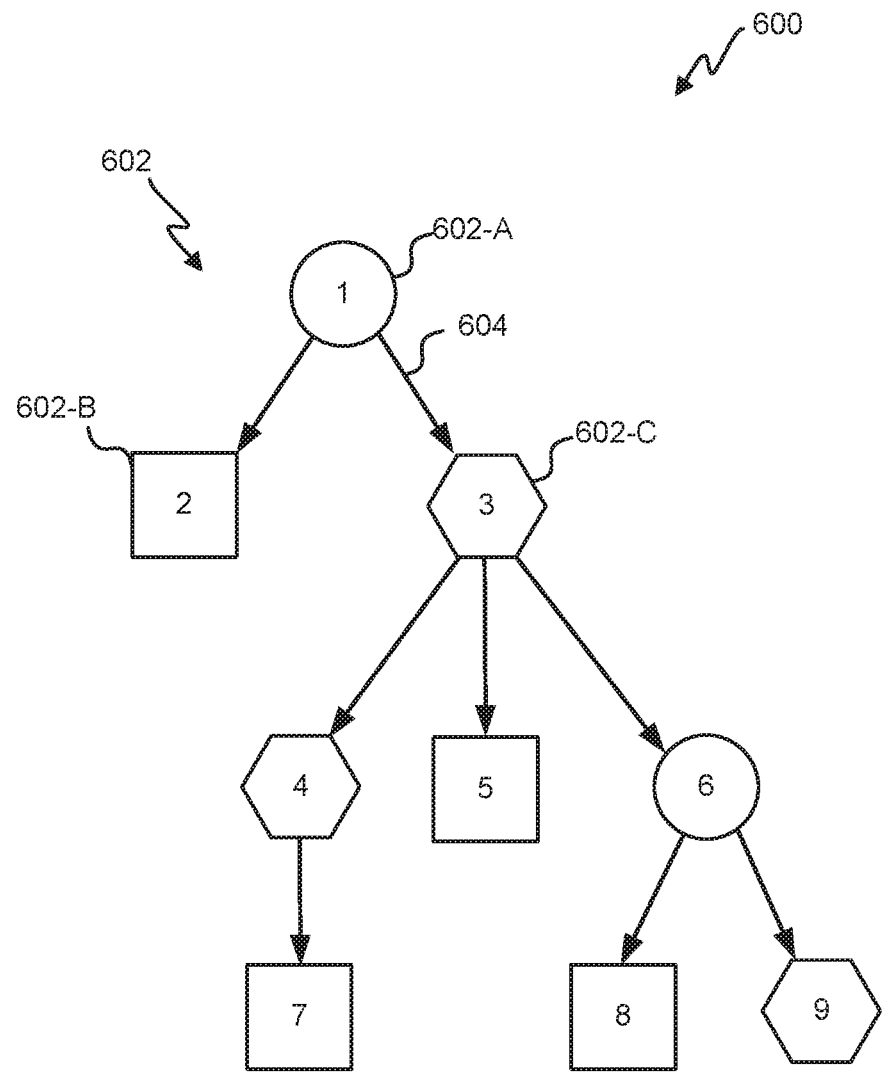
FIG. 6 is a schematic illustration of one embodiment of a conversation thread.

With reference now to FIG. 6, a schematic illustration of one embodiment of a conversation thread 600 is shown. The conversation thread 600 includes a plurality of contributions 602 connected in a hierarchical manner. The contributions 602 can include, for example, a user comment, user-provided content, or the like. In some embodiments, user-provided content can include, for example, a citation, a picture, an image, a video, a video clip, sound clip, a reference, or the like.

The contributions 602 shown in FIG. 6 include a first set of contributions 602-A provided by a first user, a second set of contributions 602-B provided by a second, and a third set contributions 602-C provided by a third user. To facilitate identification of different sets of contributions, contributions belonging to the first set of contributions 602-A are indicated with a circle, contributions belonging to the second set of contributions 602-B are indicated with a square, and contributions belonging to the third set of contributions 602-C are indicated with a hexagon. As further seen in FIG. 6, each of the contributions 602 is identified with a number. The number identifying each of the contributions 602 indicates the order in which the specific one of the contributions 602 was received. Thus, the contribution 602 indicated with a "1" is the first received contribution and the contribution 602 indicated with a "9" is the last received contribution.

The contributions 602 are linked via a connector 604. The connector 604 indicates the hierarchical relationship between two contributions 602 and indicates that one of the contributions 602 is given in response to the other of the contributions 602. Thus, as seen in FIG. 6, connector 604 indicates that the contribution indicated with "3" is given in response to the contribution indicated with "1." As used herein, a response contribution indicates the latter received contribution 602 in a pair of contributions 602 linked by the connector 604.

Figure 7:
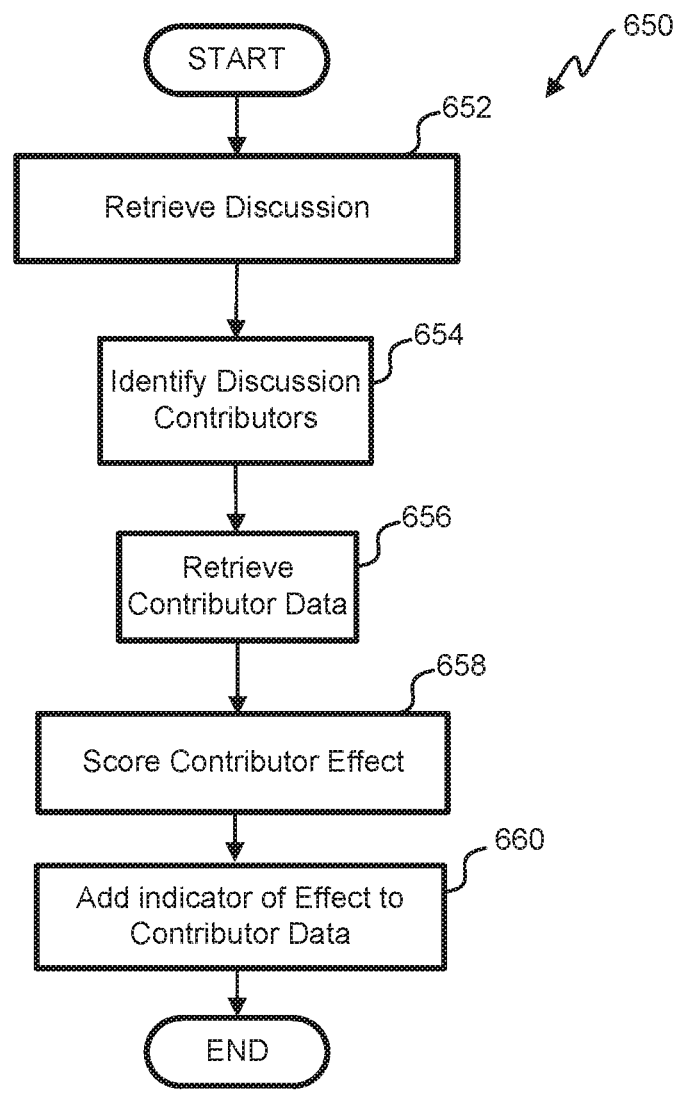
FIG. 7 is a flowchart illustrating one embodiment of a process for evaluating one or several contributions in a conversation thread.

With reference now to FIG. 7, a flowchart illustrating one embodiment of a process 650 for evaluating one or several contributions is shown. In some embodiments, the process 650 can be performed using the content distribution network 100 and/or the components thereof. The process 650 can be used to evaluate one or several contributions that can be, for example, part of a conversation thread 600.

The process 650 begins at block 652 wherein the conversation thread 600, also referred to herein as the discussion, is retrieved. In some embodiments, this can include the generation of the conversation thread via the receipt of a plurality of contributions from a plurality of user devices 106. In some embodiments, these contributions can be received encoded in one or several electrical signals, which signals can include information identifying one or several attributes of the user and/or the user device 106 from which the contribution originated. In some embodiments, these attributes can include, for example, an identification of the user and/or the user device 106, an indicia of the time of sending or receipt of the contribution, a location of the user and/or user device and the time of the generation and/or sending of the contribution, or the like. In some embodiments, the conversation thread 600 can be retrieved from one of the databases 104, and particularly from the thread database 309.

After the conversation thread 600 has been retrieved, the process 650 proceeds to block 654 wherein discussion contributors are identified. In some embodiments, this can include identifying different sets of contributions, each of which sets can originate from a different contributor. This identification can include retrieving information associated with a contribution such as some or all of the information encoded in the one or several electrical signals received from the user device 106 from which the contribution originated. In some embodiments, this information can include a user identifier such as, for example, a username, a user identification number, an identification number of the user device 106 originating the contribution, or the like.

After the contributors have been identified, the process 650 proceeds to block 656 wherein contributor data is retrieved. In some embodiments, the contributor data can be any information relating to the contributor. This contributor data can be received from one of the databases such as, for example, the user profile database 301. This information can be retrieved from the user profile database 301 by querying that database for information associated with the contributor identified in block 654. In some embodiments, the contributor data can include information relating to the contributor such as, for example, information relating to past contributor actions, past contributor performance, user preferences, or the like.

After the contributor data has been retrieved, the process 650 proceeds to block 658 wherein the contributor effect is scored. In some embodiments, the scoring of the contributor effect can include the evaluation of the conversation thread 600 to determine whether that contributor had a positive or negative influence on the conversation thread 600 and the degree to which the contributor had a positive or negative influence on the conversation thread 600. In some embodiments, this scoring can include looking at, for example, the number of contributor contributions, the number of response contributions arising from the contributor's contributions, references to the contributor's contributions, and the like. In some embodiments, the scoring of the contributor effect can further include an evaluation of: conceptual content; conversational features; strategies; stylistic and formal considerations; sentiment; position in concept ontology of course or discussion material; relative conceptual volume as compared with other contributions; or the like.

After the contributor effect score has been generated, the process 650 proceeds to block 660 wherein an indicator of the contributor effect is added to the contributor data. In some embodiments, this can include updating the user data to reflect the degree to which the user positively or negatively affected conversation thread 600.

Figure 8:
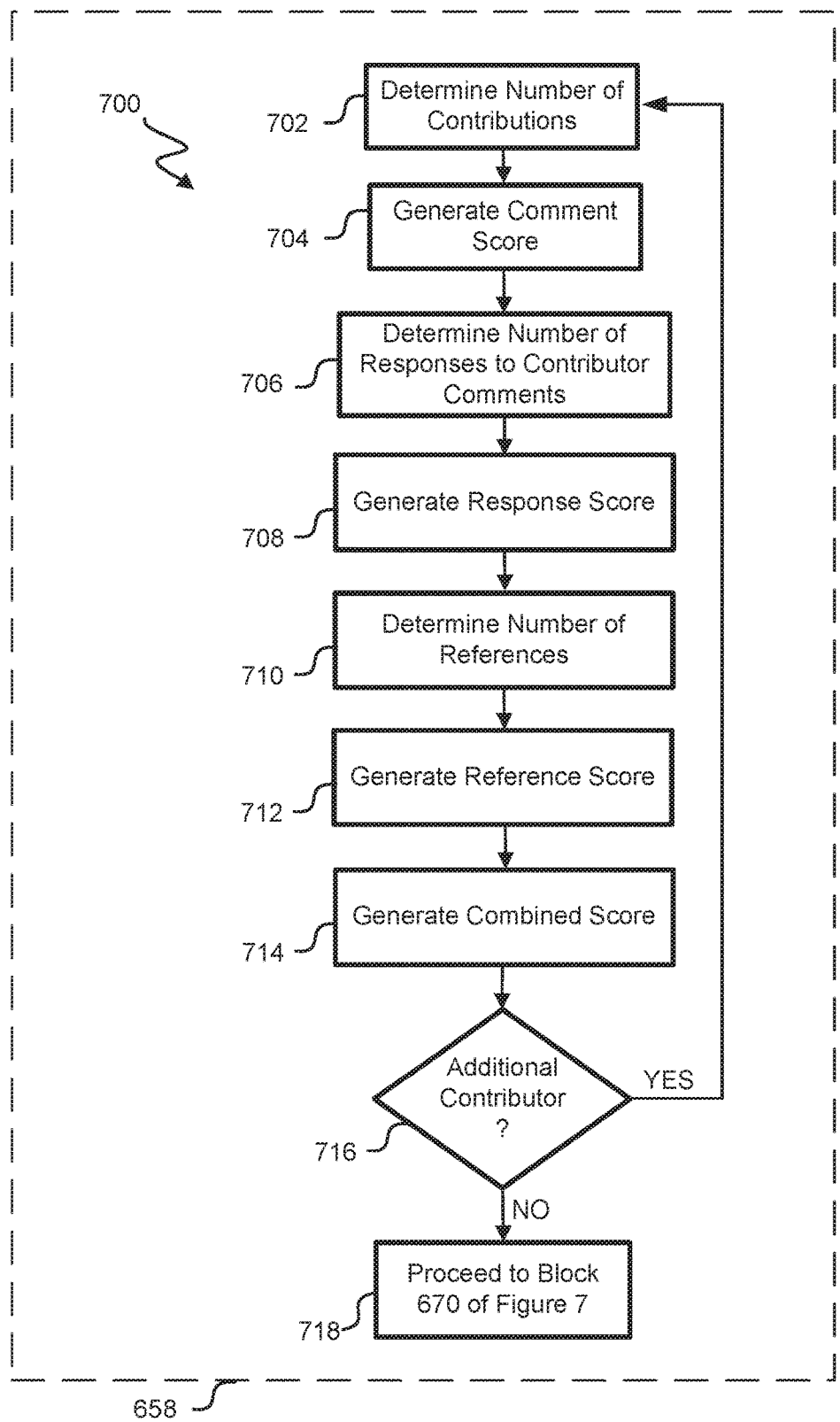
FIG. 8 is a flowchart illustrating one embodiment of a process for generating a contributor effect score.

With reference now to FIG. 8, a flowchart illustrating one embodiment of a process 700 for generating a contributor effect score is shown. In some embodiments, the process 700 can be performed in the place of step 658 shown in FIG. 7. The process 700 begins at block 702 wherein a number of contributions made by a contributor, also referred to herein as comments, is determined. In some embodiments, this determination can include associating each of the contributions 602 in a conversation thread 600 with a value indicative of the contributor responsible for the contribution 602. After each of the contributions 602 is associated with a value, the number of like values can be tallied and the number of contributions for a contributor can be determined.

In some embodiments, the number of contributions made by a contributor can be determined via the user of a counter. In one embodiment, for example, each contributor can be associated with a unique counter, or with a unique count. In some embodiments, this unique counter or count can include one or several sub-counters or sub-counts that can be incremented to track the number of contributions by the user associated with the count/counter to a specific thread, in response to a comment in a specific thread, or the like.

This unique counter or count can be incremented when a user contribution is received. Specifically, in one embodiment, when an electrical signal containing a contribution as payload is received by, for example, the server 102, the contributor originating that contribution can be identified and/or the user device 106 sending the electrical signal can be identified. The identification of the contributor/user device 106 can be used to identify the counter or count uniquely associated with that contributor/user device 106. Once the counter/count has been identified, the counter/count can be incremented to reflect the newly received contribution.

After the number of contributions for a contributor has been determined, the process 700 proceeds to block 704 wherein a contribution score, also referred to herein as a comment score, is generated. In some embodiments, the comment score can reflect the number of contributions to a thread that were made by the contributor, the percentage of contributions 602 in a conversation thread 600 that are from the contributor, or the like.

After the common score has been generated, the process 700 proceeds to block 706 wherein a number of responses to contributions made by the contributor is determined. In some embodiments, this can be a measure of the degree to which the user's contributions resulted in further comments being added to the thread, and more generally can indicate the weight or importance of one or several contributions of one or several of the contributors to a thread. In some embodiments, the weight or importance of these contributions can be determined based on responses of one or several other contributors in the thread.

In some embodiments, the determination of the weight or importance of one or several contributions can include determining the number of responses made directly to a contribution, such as, for example, when the response is directly connected to the contribution via a single connector 604 and/or determining the total number of responses made to a contribution including, for example, responses connected to a contribution by a plurality of connectors 604. With specific reference to FIG. 6, direct responses to contribution 3 are contributions 4, 5, and 6, and the total group of responses to contribution 3 are contributions 4, 5, 6, 7, 8, and 9.

In some embodiments, the number of responses generated from a contribution can be determined by identifying the counts or counters associated with that contribution, retrieving, from those identified counts or counters, a value identifying the total number of contributions tracked by that count or counter, and combining those retrieved values.

After the number of responses to contributor comments has been determined, the process 700 proceeds to block 708 wherein the response score is generated. In some embodiments, the response score can reflect the number of responses to a contribution, the percentage of responses to the contribution in a conversation thread 600, or the like. In some embodiments, the response score can further reflect the weight or importance of these contributions. Specifically, in some embodiments, the response score can be affected by: the relevance of one or several contributions to others of the contributions; the concept volume of a contribution, the concept spread provided by the contribution and/or resulting from the contribution, the contribution frequency of one or several contributors, or the like.

In one embodiment, for example, the value of a response contribution can be affected by one or several attributes of the contributor of that response contribution. For example, the response score of a contribution having a number of responses would be relatively lower if the contributors of those responses were relatively more prolific and/or if their contributions were relatively less relevant to the thread and/or contributions therein than if the contributors of those responses were relatively less prolific and/or if their contributions were relatively more relevant to the thread.

After the response score has been generated, the process 700 proceeds to block 710 wherein a number of references are determined. In some embodiments, the number of references is the number of times that a contribution or the content of a contribution is referred to in a conversation thread. In some embodiments, these references can be found in response contributions, or in non-response contributions added to a thread after the contribution that is being referenced. In some embodiments, the number of references can be determined by content evaluation of the contributions 602 of the conversation thread 600. This content evaluation can be performed by, for example, the server using, for example, semantic analysis, natural language processing, or the like. In some embodiments, this content evaluation can further include an evaluation of the quality of references such as by, for example, an evaluation of the relevance of the reference, an evaluation of the topical content of the reference, an evaluation of the authority of the reference, or the like. The number of references and/or a value indicative of the quality of the references can be stored in one of the databases such as the thread database 309.

After the number of references has been determined, the process 700 proceeds to block 712 wherein a reference score is generated. In some embodiments, the reference score can reflect the number of references to a contribution 602, the percentage of total references in a conversation thread 600 that refer to the contribution 602, or the like. In some embodiments, the reference score can further include information relating to the substance and/or quality of the references. In some embodiments, the quality of a reference can be based on the relevance of the reference, the topical content of the reference, the authority of the reference, or the like.

After the reference score has been generated, the process 700 proceeds to block 714 wherein a combined score is generated. In some embodiments, the combined score can be based off of one or several of the comment score, the response score, and the reference score. In some embodiments, the weightings of these different scores can be based on a decided importance of each of the scores. This combined score can be generated by the server 102.

After the combined score has been generated, the process 700 proceeds to decision state 716, wherein it is determined if there is an additional contributor to be analyzed. In some embodiments, this determination can be made by, for example, the server 102. In some embodiments, this can include evaluation of the conversation thread 600 to determine if a combined score for each of the contributors to the conversation thread 600 has been determined. If a combined score for a contributor to the conversation thread 600 has not been determined, then the process 700 can return to block 702 and proceeds as outlined above. If the combined score has been generated for all of the contributors to the conversation thread 600, then the process 700 can advance to block 718 and proceeds as outlined in block 660 of FIG. 7.

Figure 9:
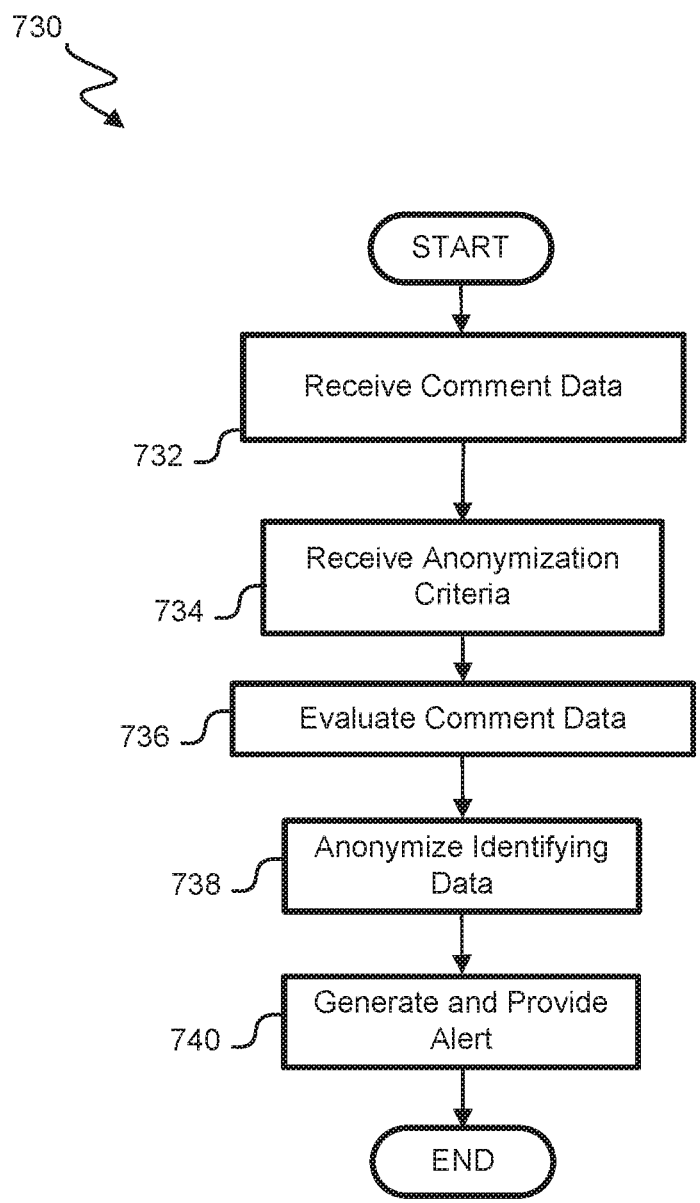
FIG. 9 is a flowchart illustrating one embodiment of a process for anonymizing contribution data based, in part, on location data received from location hardware.

With reference now to FIG. 9, a flowchart illustrating one embodiment of a process 730 for anonymizing contribution data is shown. In some embodiments, the process 730 can be performed to protect the identity of one or several contributors to one or several conversation threads. The process 730 begins at block 732 wherein comment data, also referred to herein as contribution data, is received. Comment data is information associated with a contribution and can include, for example, comment content data which is the content of the contribution and/or is associated with the content of the contribution, and comment structure data which relates to non-content aspects of the contribution such as, for example, the thread in which the contribution is placed, the order in the thread in which the contribution is placed, identification of the user originating the contribution, one or several user attributes, or the like.

In some embodiments, comment data can be received simultaneously with the receipt of a contribution via one or several encoded electric signals from a user device 106, and in some embodiments, comment data can be received at a time other than when the contribution 602 is added to a conversation thread 600. In some embodiments, this data can identify, for example, the contributor, the date and time of the contribution, one or several groups, courses, or conversation threads 600 associated with the contribution 602, information relating to the contributor, or the like. In some embodiments, the comment data can be stored in one of the databases 104 such as, for example the user profile database 301 and/or the thread database 309.

After the comment data has been received, the process 730 proceeds to block 734 wherein anonymization criteria are received. In some embodiments, the anonymization criteria can comprise one or several anonymization rules that can, for example, identify the degree to which the contribution is anonymized. In some embodiments, these rules can specify how a contribution should be anonymized, what level of identifying information should be removed from a contribution, or the like. In some embodiments, these rules can be varied based on, for example, the intended use of the contributions 602, the physical location of the user at the time of the origination of the contribution and/or at the time of the receipt of the contribution by, for example, server 102 from the user device source of the contribution, or the like.

After the anonymization criteria have been received, the process 730 proceeds to block 736 wherein the comment data is evaluated. In some embodiments, the evaluation of the comment data can include a content evaluation of the comment data to detect identifying data that may be contained within the comment data. This can include the parsing of the comment and/or the comment data to extract one or several images, text or character strings, or any other data that could be identifying. In some embodiments, this identifying data may identify, for example, the author of the contribution 602, another contributor, or another person. The comment data can be evaluated by the server 102, the privacy server 108, and/or any other component of the content distribution network 100.

After the comment data has been evaluated, the process 730 proceeds to block 738 wherein identifying data is anonymized. In some embodiments, the anonymization of identifying data can include the deletion of identifying data, the redaction of identifying data, the encryption of identifying data, the substitution of a code name for a real name, or any other technique that can obscure or destroy the identifying data. The identifying data can be anonymized by the server 102, the privacy server 108, and/or any other component of the content distribution network.

After the identifying data has been anonymized, which can include anonymizing identifying data for one or several contributions, one or several threads, or the like, the process 730 proceeds to block 740, wherein an alert is generated and provided. In some embodiments, the alert can be generated by the central server 102 and/or the privacy server 108. The alert can be provided to at least one of the user devices 106 and/or the supervisor device 110. In some embodiments, an alert, containing information relevant to anonymized contributions originating from a single user, can be provided to that user for verification of the anonymization. This can include requesting confirmation from the user that anonymization has satisfactorily anonymized the contribution.

In some embodiments, for example, the providing of this alert can include the identification of one or several user devices 106 and/or user accounts associated with the user. After these one or several user devices 106 and/or user accounts have been identified, the providing of this alert can include determining a user location of the user based on determining if the user is actively using one of the identified user devices 106 and/or accounts. If the user is actively using one of the user devices and/or accounts, the alert can be provided to the user via that user device 106 and/or account that is actively being used. If the user is not actively using a user device 106 and/or account, a default device, such as a smart phone or tablet, can be identified and the alert can be provided to this default device. In some embodiments, the alert can include code to direct the default device to provide an indicator of the received alert such as, for example, an aural, tactile, or visual indicator of receipt of the alert.

Figure 10:
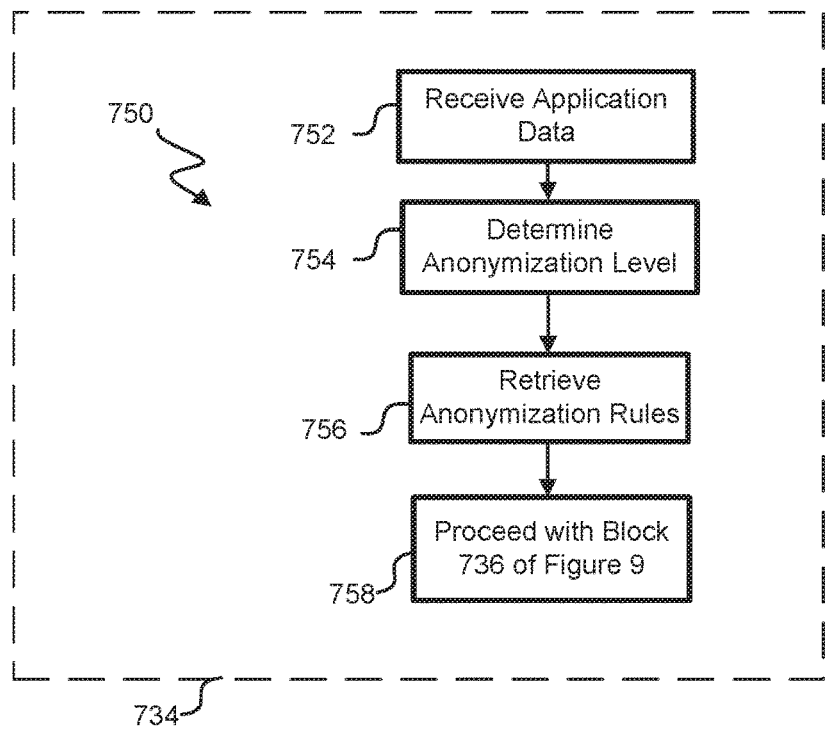
FIG. 10 is a flowchart illustrating one embodiment of a process for receiving anonymization criteria.

With reference now to FIG. 10, a flowchart illustrating one embodiment of a process 750 for receiving anonymization criteria is shown. In some embodiments, the process 750 can be performed as part of block 734 of FIG. 9. The process 750 can be performed by one or several components of the content distribution network 100 including, for example, the server 102, one or several of the user devices 106, the privacy server 108, and/or the supervisor device 110. The process 750 begins at block 752 wherein application data is received. The application data can identify the intended use of the comment data and the intended location of that use. In some embodiments, for example, the application data can indicate that comment data will be publicly available on one or several websites, and in some embodiments, the application data can indicate that the comment data will be used in determining user performance.

In some embodiments, the application data can include, for example, the location of one or several intended recipient components of the content distribution network 100 as determined by location determining hardware and/or software in those other components. In some embodiments, this hardware and/or software can include one or several GPS receivers and/or antennas. The application data can be specified by the user-supervisor and can be received by, for example, the server 102 and/or the privacy server 108 from the supervisor device 110

After the application data has been received, the process 750 proceeds to block 754 wherein the anonymization level is determined. In some embodiments, the anonymization level relates to a desired degree of anonymization. In some embodiments, one or several anonymization tables can be stored in one of the databases 104 such as, for example, the content access data store 306. These one or several anonymization tables can be generated by one or several users and can be received for storage in the database 104 from, for example, the supervisor device 110, the user data server 114, and/or the administrator server 116.

In some embodiments, an anonymization table can specify one or several levels of anonymization that can be based on, for example, the intended use of the comment data, the source of the comment data, and specifically the physical location and/or the active location of the user and/or user device 106 at the time that the comment data was generated and/or provided to the other components of the content distribution network 100, the location of the other components of the content distribution network 100 that will be receiving the comment data, or the like. In some embodiments, the identifying of the anonymization level can include receiving location information, such as physical and/or active location information from the user device, retrieving an anonymization table, and extracting level data from the anonymization table based on one or both of the physical and active location information. In some embodiments, the extracted level data can include the anonymization level.

As used herein, the physical location specifies a place that the user is located, whereas the active location specifies a jurisdictional location which can correspond to a physical location, membership in a group, usage of one or several resources, or the like. In some embodiments, the physical location can be determined based on data received from location features, and in some embodiments the active location can be determined based on a combination of data received from location features, user data retrieved from the user profile database 301, and/or data received from the accounts database 302. Specifically, in some embodiments, the active location may be based on the physical location of the user and one or several user memberships which can be, for example, memberships in a university, school, program, grade, course, class, or the like. In some embodiments, for example, the level of required anonymization may vary as the comment data is transported from one jurisdiction to another such as, for example, from one state, country, province, county, district, school, university, or region to another state, country, province, county, district, school, university, or region.

After the anonymization level has been determined, the process 750 proceeds to block 756 wherein anonymization rules are retrieved. In some embodiments, the anonymization levels can be associated with one or several anonymization rules, the application of which results in anonymization of comment data of the desired anonymization level. In some embodiments, these anonymization rules can identify the criteria for determining when the desired anonymization level has been achieved. In some embodiments, these anonymization rules can indicate what comprises identifying data that is subject for anonymization, how the identifying data should be anonymized including, for example, deletion of the anonymization data, encoding and/or encryption of the anonymization data, or the like. The anonymization rules can be retrieved from, for example, the database 104, and specifically from the thread database 309. After the anonymization rules have been retrieved, the process 750 continues to block 758 and proceeds with block 736 of FIG. 9.

Figure 11:
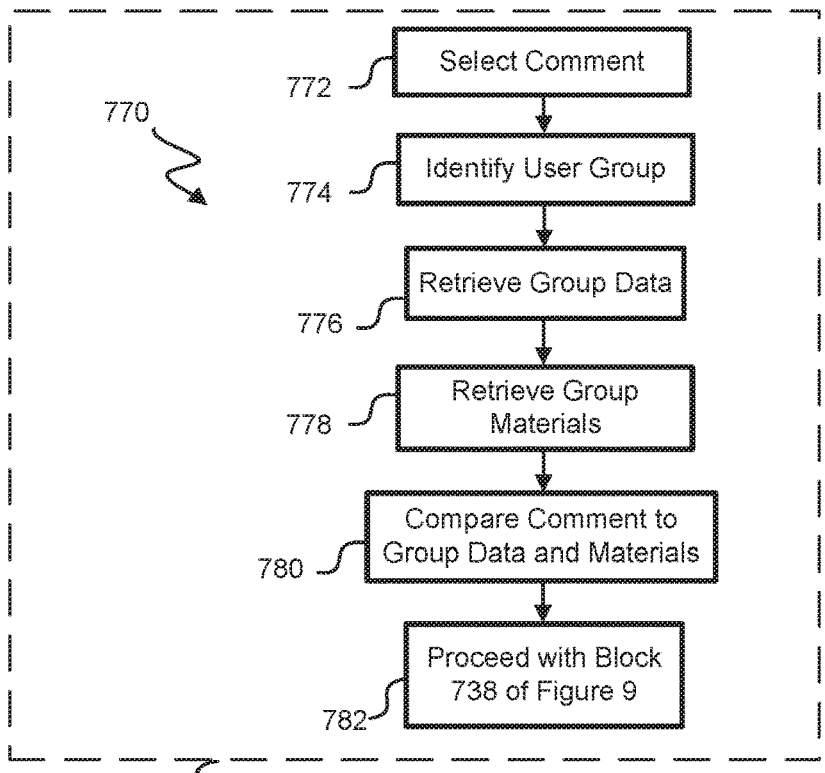
FIG. 11 is a flowchart illustrating one embodiment of a process for evaluating comment data.

With reference now to FIG. 11, a flowchart illustrating one embodiment of a process 770 for evaluating comment data is shown. The process 770 can be performed in the place of block 736 of FIG. 9. The process 770 begins at block 772 wherein a comment is selected. In some embodiments, comments can be systematically selected until all of the comments 772 of a conversation thread 770 have been selected and analyzed. The comment can be selected by the component of the content distribution network anonymizing the comment. In some embodiments, the selected comment can be selected from, for example, one or several comments in the thread database 309 by, for example, the privacy server 108 and/or the server 102. In some embodiments, the selected comment can be a comment received by, for example, the privacy server 108, and can specifically be a comment being provided for inclusion in a thread that is being routed through the privacy server. In some embodiments, this privacy server can be located within the same jurisdiction as the user device 106 that is the source of the comment. As used herein, a jurisdiction describes any real or virtual area or realm in which data is able to freely move without being subject to privacy restrictions.

After the comment has been selected, the process 770 proceeds to block 774 wherein a user group is identified. In some embodiments, the user group can comprise all of the contributors to a conversation thread 770. In some embodiments, the user group can be identified by receiving user data indicative of group affiliation from the user profile database 301. In some embodiments, for example, the user profile database 301 can include one or several values associated with some or all of the users identified in the user profile database 301. These one or several values can identify groups to which the associated user belongs. In some embodiments, the server 102 and/or the privacy server 108 can query the user profile database 301 for identification of users in a group. In response to this request, the user profile database 301 and/or a processor associated therewith can identify some or all of the users having associated values indicative of belonging to the specified group. A response to the received query can then be provided to the server 102 and/or the privacy server 108 and can identify these users.

After the user group has been identified, the process 770 proceeds to block 776 wherein group data is retrieved. In some embodiments, the group data can comprise information relating to the contributors identified in the user group. In some embodiments, this information can identify posting and/or contribution histories of the contributors, groups associated with contributors, attributes of the contributor such as, for example, a learning style, personality, or the like, or any other desired information. The group data can include data identifying the attributes of one or more of the users in the group. This group data can be retrieved from the user profile database 301.

After the group data has been retrieved, the process 770 proceeds to block 778 wherein group materials are retrieved. In some embodiments, group materials can be materials associated with the group such as, for example, course materials, materials referenced by members of the group, group or individual group member work product, or materials identified by a user including, for example, a student or teacher. The group materials can be retrieved from one or several of the databases 104 including, for example, the content library database 303.

After the group materials have been retrieved, the process 770 proceeds to block 780 wherein comments are compared to the group data and group materials. In some embodiments, this comparison can be used to determine whether the content of the comments comprises identifying data that identifies an individual such as, for example, a contributor to a conversation thread 600 or the like. After comments have been compared to group data and group materials, the process 770 proceeds to block 782 and continues with block 738 of FIG. 9.

Figure 12:
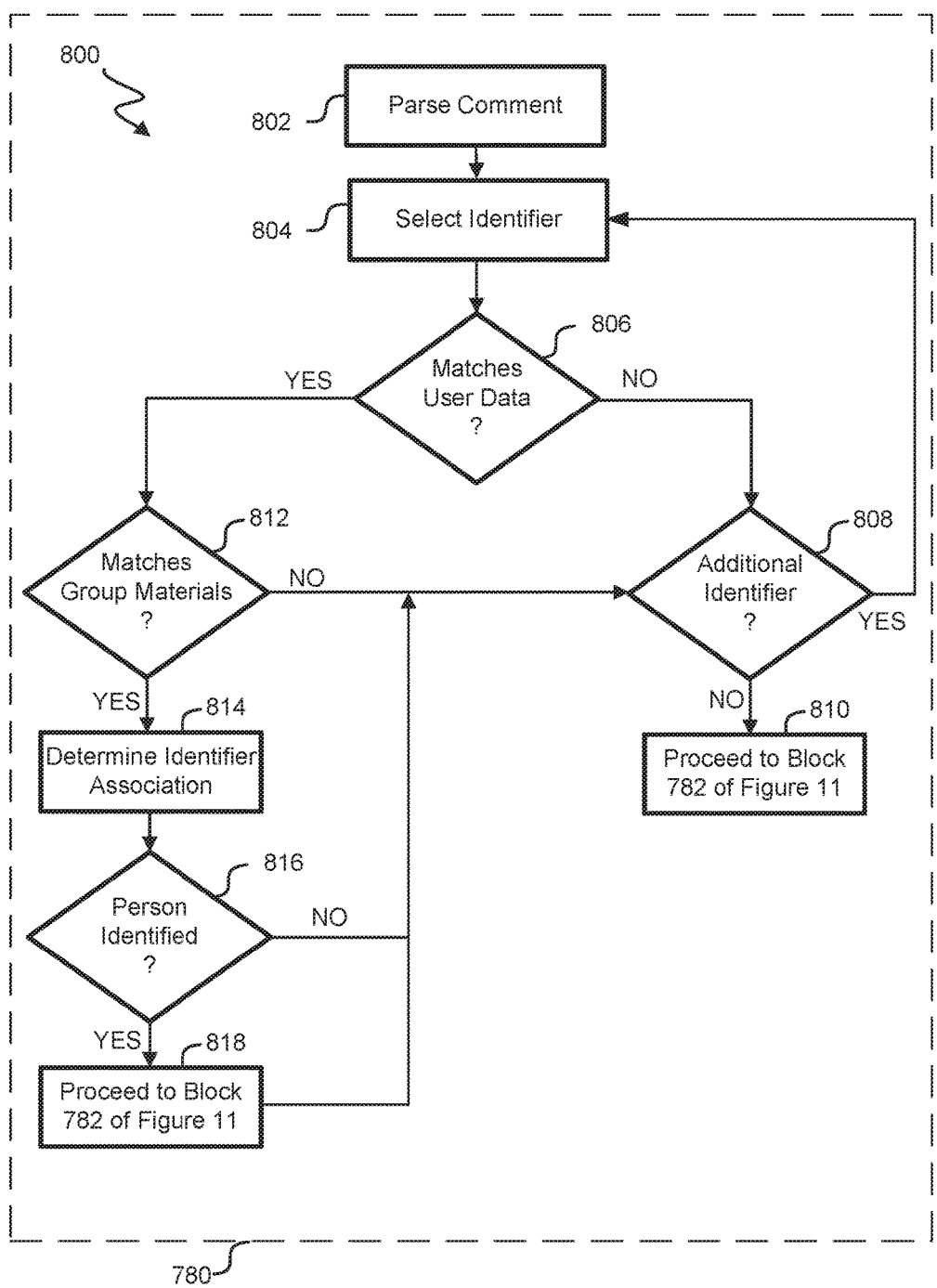
FIG. 12 is a flowchart illustrating one embodiment of a process for comparing one or several comments to group data and group materials.

With reference now to FIG. 12, a flowchart illustrating one embodiment of a process 800 for comparing one or several comments to group data and group materials is shown. In some embodiments, this process 800 can be performed as part of or in the place of block 780 of FIG. 11. The process 800 begins at block 802 wherein a comment and/or contribution is parsed. In some embodiments, this can include analysis of the content of the comment to determine potential identifiers or potential identifying data. In some embodiments, the parsing of the comment can include evaluation of comment content for one or several names, initials, nicknames, salutations, valedictions, signature lines or blocks, addresses, telephone numbers, identification numbers including, for example, one or several government identification numbers, or the like. The parsing can be performed by the server 102 and/or the privacy server 108 according to known parsing algorithms.

After the comment has been parsed, the process 800 proceeds to block 804, wherein a potential identifier is selected. In some embodiments, potential identifiers can be serially and/or systematically selected such that all of the potential identifiers within a comment are evaluated. After the potential identifier has been selected, the process 800 proceeds to decision state 806 wherein it is determined if the potential identifier matches user data. In some embodiments, this can include comparison of the potential identifier to the user data to detect a match and/or a partial match between the potential identifier and the user data.

If it is determined that the potential identifier does not match the user data, then a value indicative of the non-match between the potential identifier and the user data is associated with the potential identifier in, for example, the thread database 309, and the process 800 proceeds to decision state 808 wherein it is determined if there is an additional potential identifier. If there is an additional potential identifier, then the process returns to block 804 and proceeds as outlined above. If it is determined that there is not an additional identifier, then the process 800 continues to block 810 and proceeds to block 782 of FIG. 11.

Returning again to decision state 806, if it is determined that the potential identifier matches the user data, then a value indicative of the match between the potential identifier and the user data is associated with the potential identifier in, for example, the thread database 309, and then the process 800 proceeds to decision state 812 wherein it is determined if the potential identifier matches any information contained within the group materials. In some embodiments, this determination can be used to determine whether the potential identifier could refer to a material instead of an individual. In some embodiments, the group materials can include materials used in a class associated with conversation thread 600 containing the comment, material cited by other contributors in the conversation thread 600 and/or another conversation thread 600 associated with the contributor and/or group, or the like. In some embodiments, a potential identifier that includes information that matches the user data and the group materials may be selected for further evaluation to determine if the potential identifier is an actual identifier, and in some embodiments, the potential identifier that matches the user data and does not match the group materials can be designated as an actual identifier.

If it is determined that the potential identifier does not match any of the group materials, then a value identifying the potential identifier as an actual identifier is associated with the potential identifier and the process 800 proceeds to decision state 808 and proceeds as outlined above.

If it is determined that the potential identifier matches some or all of the group materials, then the process 800 proceeds to block 814 wherein identifier association is determined. In some embodiments, determining identifier association can include contextual analysis of data surrounding the potential identifier including some or all of the content of the comment to attempt to determine whether the comment refers to a portion of the group material data and/or to a portion of the user data.

This evaluation of identifier association can include identifying a window size for evaluation, wherein the window size specifies an amount of data surrounding the potential identifier for analysis. In some embodiments, the window size can be specified by a window size parameter that can be stored in one of the databases 104 such as the thread database 309. After the window size has been determined, the data within the window can be identified, retrieved and/or received, and subject to analysis such as contextual analysis, semantic analysis, or the like. In some embodiments, this analysis can further include natural language processing. These analyses can output data indicative of the association of the potential identifier, and specifically can output an indicator of the potential identifier being associated with one of the user data and the group materials, or alternatively an output indicating inconclusive results of the analysis. In some embodiments, this output data can further include information identifying a degree of confidence associated with the indicator of the association of the potential identifier.

In some embodiments, the determination of the identifier association can include automatic processing, and in some embodiments, if the automatic processing does not adequately resolve the ambiguity, the determination of the identifier association can include triggering human evaluation of the comment and the potential identifier. In embodiments in which human evaluation is triggered, an alert can be provided to a user device 106 and a prompt to provide the human evaluation. This alert can include one or several links to user data and/or group data, as well as can include either the content of the comment or a link to the content of the comment. In some embodiments, and in response to this alert, a response can be received from the user identifying the potential identifier as either an actual identifier or as not an actual identifier.

In some embodiments, a value can be associated with a potential identifier based on the results of the determination of block 814. In one embodiment, a first value can be associated with the potential identifier if it is determined that the potential identifier is an actual identifier, a second value can be associated with the potential identifier if it is determined that the potential identifier is not an actual identifier, and a third value can be associated with the potential identifier if the status of the potential identifier is undetermined. In some embodiments, a degree of confidence can be associated with the status of the potential identifier.

After the identifier association has been determined, the process 800 proceeds to decision state 816 wherein it is determined if the potential identifier is an actual identifier. In some embodiments, this can include evaluation of the values associated with a potential identifier in block 814. If it is determined that the potential identifier is not an actual identifier, then the process 800 proceeds to decision state 808 and continues as outlined above. If it is determined that the potential identifier is an actual identifier, then the process 800 proceeds to block 818 and continues with block 782 of FIG. 11. In some embodiments, the process 800 can further continue to decision state 808 and can continue as outlined above.

Figure 13:
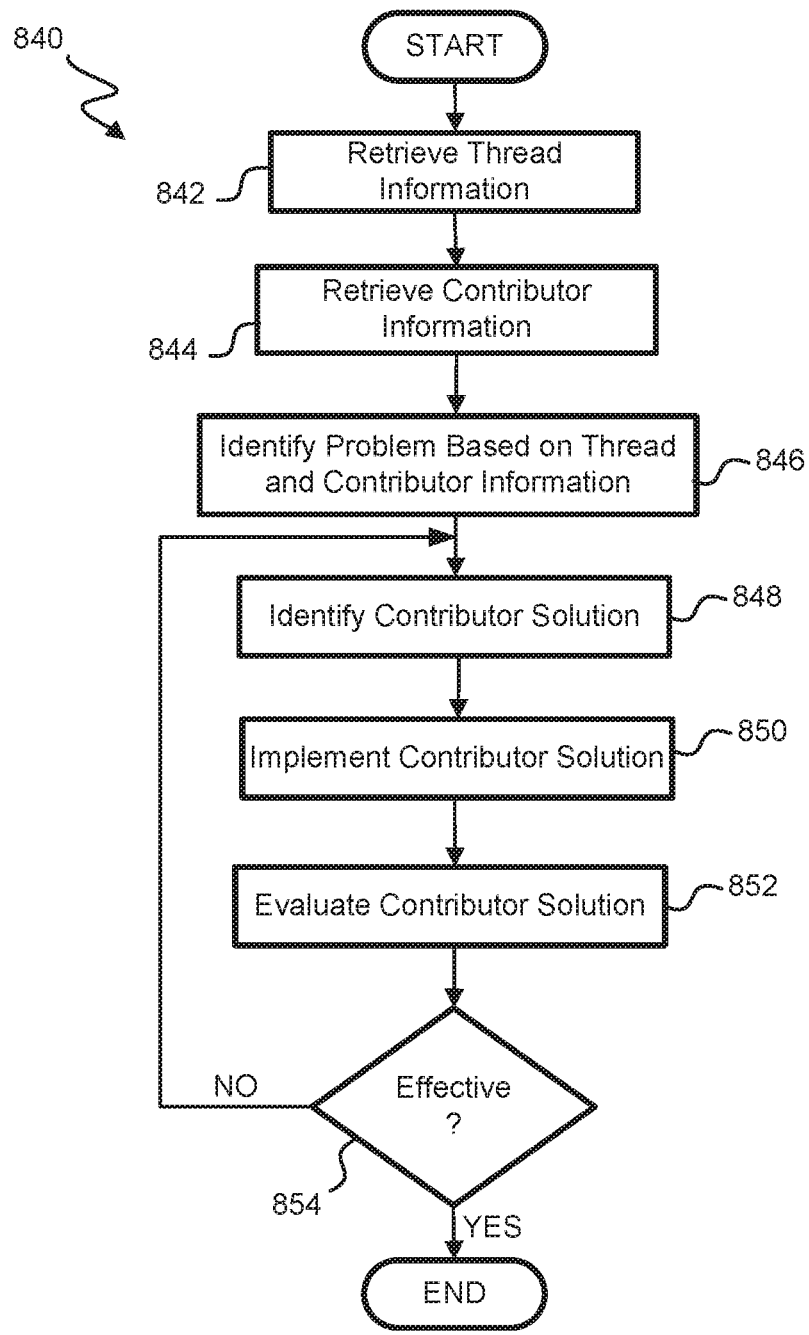
FIG. 13 is a flowchart illustrating one embodiment of a process for resolving a problem based on thread and contributor information.

With reference now to FIG. 13, a flowchart illustrating one embodiment of a process 840 for identifying and resolving a problem in a thread based on thread information and contributor information is shown. The process 840 begins at block 842 wherein conversation thread information is received. In some embodiments, the conversation thread information can identify the contributors to conversation thread 600 and/or the contributions 602 comprising the conversation thread 600. The thread information can be received from one of the databases 104 such as the thread databased 309. After the thread information has been received, the process 840 proceeds to block 844, wherein contributor information is retrieved. In some embodiments, the contributor information can include information identifying one or several traits of the contributors, the nature of their contribution, or the like. The contributor information can be retrieved from, for example, the user profile database 301.

After the contributor information has been retrieved, the process 840 proceeds to block 846 wherein a problem is identified based on thread and/or contributor and/or group information. In some embodiments, the problem can be identified by evaluation of the thread information which can include, for example, an analysis of the conversation thread 600 and/or the contributions 602 composing the conversation thread 600. This thread information can be retrieved and/or received from the thread database 309.

These identified problems can, for example, relate to the status of a thread such as a thread that is inactive, dead, and/or unproductive; can relate to the content of one or several contributions such as, for example, the relevance of the contributions to a topic of the thread, which topic can be identified by a user via an input from a user device 106 and/or a supervisor device 110 at the time of the creation of the thread and/or can be identified by computerized analysis of a first comment in the thread to identify a thread topic.

In some embodiments, an activity level of a thread can be determined by tracking, for example, the rate of new contributions being added to a thread and/or the frequency of new contributions being added to a thread. In some embodiments, this rate and/or frequency can be determined by maintain a moving window identifying a period of time, and tracking the number of contributions received in that moving window. In some embodiments, one or several values indicative of a thread's status can be associated with the thread based on the comparison of the rate of new contributions and one or both of the first and second thresholds.

In some embodiments, a thread can be identified as inactive if the rate and/or frequency of receipt of new contributions drops below a first threshold, and in some embodiments, a thread can be identified as dead if the rate and/or frequency of receipt of new contributions drops below a second threshold, which second threshold can be lower than the first threshold such that all dead threads are inactive, but not all inactive threads are dead. In some embodiments, one or both of the first and second thresholds can be specified by a user such as a user-supervisor including, for example, a teacher via one of the user devices 106 and/or the supervisor device 110.

In some embodiments, the identification of a thread status such as productive, active, inactive, dead, and/or the like can include the determination of a confidence level of the identified thread status and the providing of this confidence level. In some embodiments, the confidence level can be, for example, a measure of the amount of data indicative of the status. Thus, for example, a thread having a contribution rate that just dropped below one or both of the first and second thresholds would have a lower confidence level of the accuracy of a classification as dead or inactive than a thread having a contribution rate that has been below the one or both of the first and second thresholds for an extended period of time. In some embodiments, for example, a timer associated with a thread can be triggered and/or a time data identifying a time and/or data can be stored when a thread status changes. In some embodiments, this can allow the determination of the lapsed time since the last status change, which lapsed time can affect the confidence level. In some embodiments, the confidence level can further be affected by the relative proximity of the thread to a threshold that, if crossed, would result in a status change.

In some embodiments, an alert can be generated and provided when the thread is identified as one or both of inactive and dead. In some embodiments, the alert can be generated by the central server 102 and/or the privacy server 108. The alert can be provided to at least one of the user devices 106 and/or the supervisor device 110. In some embodiments, an alert, containing information relevant to the thread and can include information identifying problems associated with the thread. In some embodiments, the alert may include a prompt to, for example, close the thread or take action to rejuvenate the thread.

In some embodiments, for example, the providing of this alert can include the identification of the creator of the thread and/or the one or several user devices 106 and/or supervisor devices 110 and/or user accounts associated with this identified creator of the thread. After these one or several devices 106, 110 and/or user accounts have been identified, the providing of this alert can include determining a user location of the thread creator based on determining if the thread creator is actively using one of the identified devices 106, 110 and/or accounts. In some embodiments, the use location may correspond to a physical location of the thread creator and the device 106, 110 being actively used, and in some embodiments, the use location can comprise the user account and/or user device which the creator of the thread is currently using.

If the thread creator is actively using one of the devices 106, 110 and/or accounts, the alert can be provided to the thread creator via that device 106, 110 and/or user account that is actively being used. If the thread creator is not actively using a device 106, 110 and/or account, a default device, such as a smart phone or tablet, can be identified and the alert can be provided to this default device. This default device can be a user device 106 and/or supervisor device 110, but can be a subset of those devices 106, 110 that is uniquely associated with the user and/or thread creator such as is the case with: a smartphone serving as the user's and/or thread creator's telephone; a personal tablet or laptop, or the like. In some embodiments, the alert can include code to direct the default device to provide an indicator of the received alert such as, for example, an aural, tactile, or visual indicator of receipt of the alert.

After the problem has been identified, based on thread and/or contributor information, the process 840 proceeds to block 848 wherein a contributor solution is identified. In some embodiments, the contributor solution can be any solution to remedy and/or address the identified problem that can be implemented by a contribution and/or contributor. This can include, for example, pairing a first contributor with the second contributor and/or with a group of other contributors, posting of the contribution from a contributor and/or content from a contributor, or the like. In some embodiments, the solution can be identified based on past effects of contributions and/or contributors on problems. In some embodiments, the solution can be a piece of editorial or other content, or a piece of computer-generated dialog, that can be contributed automatically to the thread.

In one embodiment, for example, in which the identified problem is the activity level of the thread, the contributor solution can be one or several actions intended to rejuvenate the thread. In some embodiments, these one or several actions can be selected based on the effect of these same or similar actions taken in previous and/or similarly situated threads. In one embodiment, for example, thread data can include information identifying one or several topics, authors, contributors, pieces of content, or the like that increase the rate of contributions to threads and/or that increase the relevance of the contributions to threads. In some embodiments, for example, one or several topics, authors, contributors, pieces of content, or the like can be identified as increasing the rate of contributions to a thread if the inclusion of these one or several topics, authors, contributors, pieces of content, or the like in one or several previous threads resulted in increased contributions and/or large numbers of response contributions.

In some embodiments, the contributor solutions can be identified by retrieving scores for contributor effect, such as, for example, the combined score of block 714 of FIG. 8 from one of the databases 104 such as the thread database 309. In some embodiments, scores can be retrieved for contributions provided in previous threads for the same threads or for threads having contributors who individually or in aggregate have attributes corresponding to the attributes, individually or in aggregate, of the contributors of the problematic thread. Once the relevant contributions have been identified, and the contributor effect scores for those contributions that have been retrieved, the contributor solution can be selected by identifying the contributions have the largest contributor scores and/or having the largest contributor scores and the greatest topical relevance to the current thread. In some embodiments, the contributor solution can be identified by the server 102.

After the contributor solution has been identified, the process 840 proceeds to block 850 wherein the contributor solution is implemented. In some embodiments, this can include the generation of the contribution and/or the posting of the contribution that is the contributor solution and/or the creation of the circumstance that is the contributor solution. In some embodiments, the implementation of the contributor solution can further include the providing of an alert to the creator of the thread identifying the contributor solution, one or several actions to implement the contributor solution, and/or a prompt to authorize implementation of the contributor solution. This alert can be provided in a similar manner to the alerts previously discussed.

After the contributor solution has been implemented, the process 840 proceeds to block 852 wherein the contributor solution is evaluated. In some embodiments, the contributor solution can be evaluated to determine if and to what degree the contributor solution had a desired effect and/or remedied the identified problem. In some embodiments, the contributor solution can be evaluated by continued tracking of the rate of contributions and the comparison of the rate of contributions after the implementation of the contributor solution to before the contributor solution, comparing the relevancy of contributions after the solution to relevancy of contributions before the solution, or the like. This evaluation of the contributor solution can be performed by the server 102.

After the contributor solution has been evaluated, the process 840 proceeds to decision state 854 wherein it is determined if the contributor solution was effective. In some embodiments, this can include comparing information relating the desired effect and the expected effect of the contributor solution. In some embodiments, this can further include determining a change in one or several attributes of the thread attributable to the contributor solution such as, for example, a change in the rate of contributions, and change in the relevancy of the contributions, or the like. In some embodiments, this change can be compared with one or several thresholds to determine whether the contributor solution had the desired effect and the degree to which the contributor solution had the desired effect. If it is determined that the contributor solution was not effective, then the process 840 returns to block 848 and proceeds as outlined above. If it is determined that the contributor solution was effective, then the process 840 can terminate.

Figure 14:
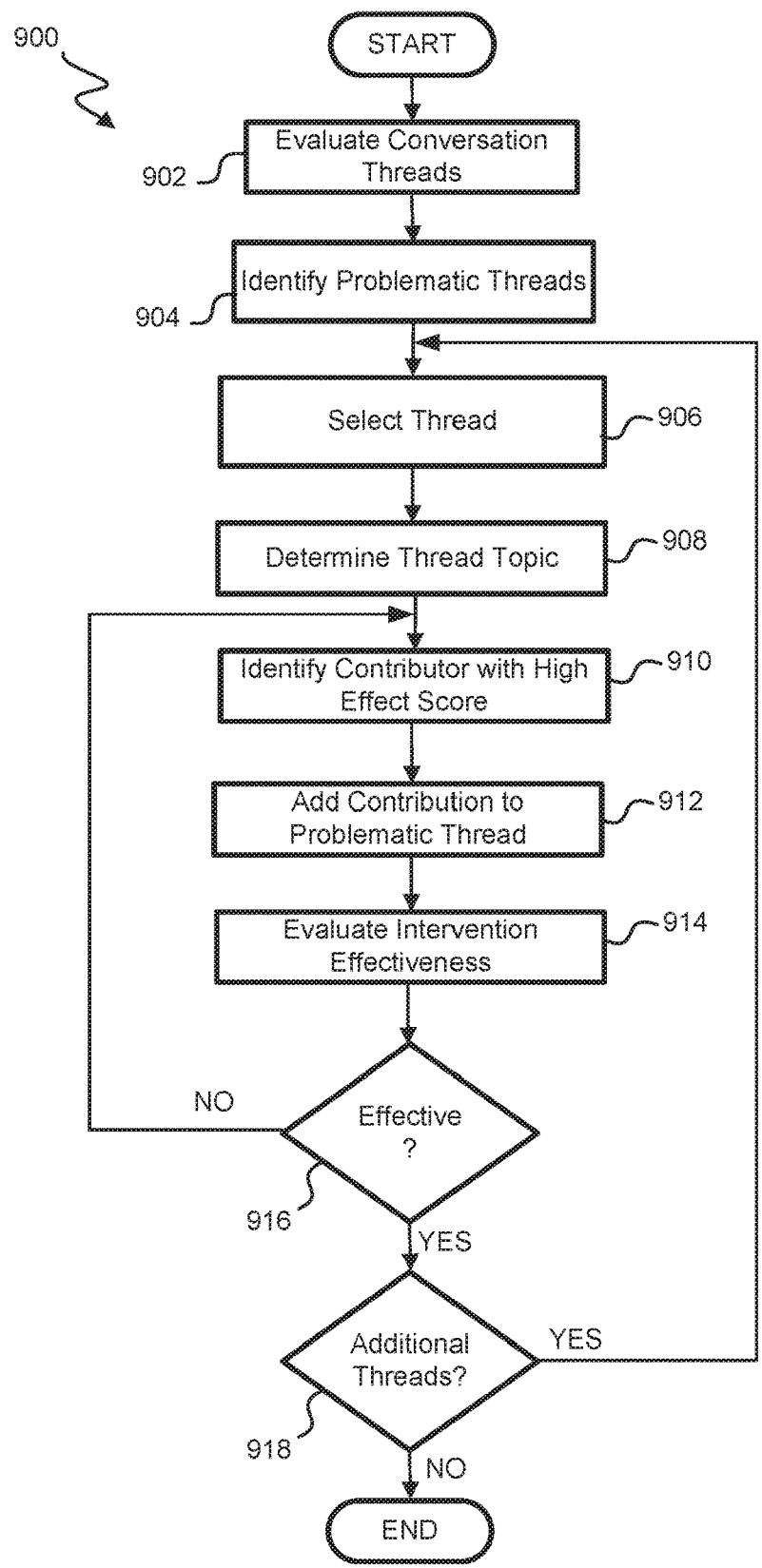
FIG. 14 is a flowchart illustrating one embodiment of a process for reviving and/or stimulating a conversation thread and sending alerts to one or several user devices.

With reference now to FIG. 14, a flowchart illustrating one embodiment of a process 900 for reviving and/or stimulating a conversation thread 600 is shown. In some embodiments, the process 900 can be used to monitor activity in one or more conversation threads. In some embodiments, the process can identify one or more conversation threads 600 having one or more undesirable traits and can identify and implement a solution to remedy those undesirable traits. In particular, the process 900 can determine when a conversation thread 600 is inactive, unproductive, or dead, and can take steps to revive and/or stimulate the conversation thread 600.

The process 900 begins at block 902 wherein the conversation threads 600 are evaluated. In some embodiments, this can include determining the number of contributions 602 in each of the conversation threads 600, determining the amount of time between contributions 602 in each of the conversation threads 600, determining the number of contributors to each of the conversation threads 600, examining the content of the conversation threads 600, comparing the content of the conversation threads 600 to course or other content, or the like. In some embodiments, the evaluation of one or several conversation threads 600 can include associating a value with the one or several conversation threads 600, which value is indicative of the activity level of the conversation thread 600.

After the conversation threads 600 have been evaluated, the process 900 proceeds to block 904, wherein one or several problematic threads are identified. In some embodiments, the identification of one or several problematic conversation threads 600 can include the retrieving of the value associated with one of the conversation threads. The identification of one or several problematic conversation threads 600 can further include retrieving a threshold value, which threshold value can demark between an acceptable level of activity and/or productivity in the conversation thread 600 and an unacceptable level of activity and/or productivity in the conversation thread 600. In some embodiments, the value indicative of the activity level and/or productivity level in the conversation thread 600 can be compared to the threshold value, and the result of the comparison of those values can indicate whether the conversation thread 600 is a problematic conversation thread 600. In some embodiments, this step can be repeated until all of the problematic conversation threads 600 have been identified or, in other embodiments, this step can be performed until a subset of all of the problematic conversation threads 600 have been identified including, for example, until one or more problematic conversation threads have been identified. In some embodiments, the step of block 904 can correspond to the step of block 846, discussed above.

In some embodiments, an alert can be generated and provided when the thread is identified as problematic. In some embodiments, the alert can be generated by the central server 102 and/or the privacy server 108. The alert can be provided to at least one of the user devices 106 and/or the supervisor device 110. In some embodiments, an alert can contain information relevant to the thread and/or can include information identifying a problem associated with the thread. In some embodiments, the alert may include a prompt to, for example, close the thread or take action to rejuvenate the thread.

In some embodiments, for example, the providing of this alert can include the identification of the creator of the thread and/or the one or several user devices 106 and/or supervisor devices 110 and/or user accounts associated with this identified creator of the thread. After these one or several devices 106, 110 and/or user accounts have been identified, the providing of this alert can include determining a user location of the thread creator based on determining if the thread creator is actively using one of the identified devices 106, 110 and/or accounts. In some embodiments, the use location may correspond to a physical location of the thread creator and the device 106, 110 being actively used, and in some embodiments, the use location can comprise the user account and/or user device which the creator of the thread is currently using.

If the thread creator is actively using one of the devices 106, 110 and/or accounts, the alert can be provided to the thread creator via that device 106, 110 and/or user account that is actively being used. If the thread creator is not actively using a device 106, 110 and/or account, a default device, such as a smart phone or tablet, can be identified and the alert can be provided to this default device. This default device can be a user device 106 and/or supervisor device 110, but can be a subset of those devices 106, 110 that is uniquely associated with the user and/or thread creator such as is the case with: a smartphone serving as the user's and/or thread creator's telephone; a personal tablet or laptop, or the like. In some embodiments, the alert can include code to direct the default device to provide an indicator of the received alert such as, for example, an aural, tactile, or visual indicator of receipt of the alert.

After the problematic conversation threads 600 have been identified, the process 900 proceeds to block 906 wherein a conversation thread 600 is selected. In some embodiments, the selected conversation thread 600 can be the first identified problematic conversation thread 600, the conversation thread 600 demonstrating the highest level of inactivity and/or productivity, a randomly selected problematic conversation thread 600, or a problematic conversation thread selected in another fashion. The problematic thread can be selected by the server 102.

After the conversation thread has been selected, the process 900 proceeds to block 908 wherein the conversation thread topic is determined. In some embodiments, the conversation topic can identify, for example, the subject matter and/or intended subject matter of the conversation topic. In some embodiments, this information can be received from the originator of the conversation thread 600, and in some embodiments, this information can be identified based on content analysis of the contributions. In some embodiments, the results of the content analysis of the contributions can be compared to, for example, one of the course materials such as a syllabus or other outline of material covered by the course, to identify the conversation thread topic. This determination of the conversation thread topic can be performed by, for example, the server 102.

After the thread topic has been determined, the process 900 proceeds to block 910 wherein a contributor with a high effect score is identified. In some embodiments, the contributor can be associated with the conversation thread 600 and/or be associated with the topic or content of the conversation thread 600. Thus, in one embodiment, the contributor can belong to a group of users having access to the conversation thread.

In some embodiments, a contributor with a high effect score can be a contributor such as a person having a history of actively engaging in one or several conversation threads, a person whose contributions 602 stimulate a large number of responses including one or both of direct and indirect responses, or content that has stimulated a large number of responses including one or both of direct and indirect responses or that is expected to stimulate a large number of responses including one or both of direct and indirect responses. In some embodiments, the high effect score can correspond to the contributor effect score determined in the process 650 of FIG. 7.

In one embodiment in which the contributor comprises content that is expected to stimulate a large number of direct or indirect responses, the content can be retrieved from an external source or several conversation threads, for example, a popular or controversial video, video clip, article, sound clip picture, event, remedial content, automated conversational agent, learning object, or the like. In such embodiments, in contrast to the process described above in FIG. 7, the high effect score can be based on a number of times the content has been accessed, such as, for example, the number of times a video has been viewed. The effect score of one or several contributors can be determined by the server 102.

After the contributor with the high effect score has been identified, the process 900 proceeds to block 912, wherein a contribution 602 from the identified contributor is added to the conversation thread 600. In some embodiments, this can include adding a comment authored by the identified contributor to the conversation thread 600, adding contributor content to the conversation thread 600, or the like. In some embodiments, this step can include requesting a contributor to post a comment to a conversation thread 600, and the contributor, in response to the request, posting a comment to a conversation thread 600.

After the contribution has been added to the problematic conversation thread 600, the process 900 proceeds to block 914 wherein the effectiveness of the added contribution, also referred to herein as the intervention, is evaluated. In some embodiments, this evaluation can be performed immediately after the contribution has been added to the conversation thread 600, and in some embodiments, this can be performed after a predetermined amount of time has passed since the contribution was added to the conversation thread 600. In some embodiments, the evaluation of the intervention effectiveness can include determining if the post-intervention conversation thread 600 has now achieved at least a minimal level of increased activity as compared to the pre-intervention conversation thread and/or as compared to the threshold. In some embodiments, a first value can be associated with the conversation thread if the intervention is effective, and a second value can be associated with the conversation thread if the intervention is ineffective. In some embodiments, the step of block 914 can correspond to the step of block 852.

After the effectiveness of the intervention has been evaluated, the process 900 proceeds to decision state 916 wherein it is determined if the intervention was effective. In some embodiments, this can include retrieving the values indicative of the effectiveness of the conversation thread 600 and determining for some or all of the conversation thread 600 whether they are associated with the first or second value associated with the conversation thread in block 914.

In some embodiments, an alert can be generated and provided based on the determined effectiveness of the intervention. In some embodiments, for example, an alert indicating the effectiveness of the intervention can be generated and provided to the user via one or several devices 106, 110 when the intervention is determined to be effective, and similarly, an alert indicating the ineffectiveness of the intervention can be generated and provided to the user via one or several devices 106, 110 when the intervention is determined to be ineffective. In some embodiments, the alert can be generated by the central server 102 and/or the privacy server 108. The alert can be provided to at least one of the user devices 106 and/or the supervisor device 110. In some embodiments, an alert, containing information relevant to the thread, can include information identifying the degree to which the intervention was ineffective or effective. In some embodiments, the alert can further include confidence information identifying the confidence in the change resulting from the intervention.

In some embodiments, for example, the providing of this alert can include the identification of the creator of the thread and/or the one or several user devices 106 and/or supervisor devices 110 and/or user accounts associated with this identified creator of the thread. After these one or several devices 106, 110 and/or user accounts have been identified, the providing of this alert can include determining a user location of the thread creator based on determining if the thread creator is actively using one of the identified devices 106, 110 and/or accounts. In some embodiments, the use location may correspond to a physical location of the thread creator and the device 106, 110 being actively used, and in some embodiments, the use location can comprise the user account and/or user device which the creator of the thread is currently using.

If the thread creator is actively using one of the devices 106, 110 and/or accounts, the alert can be provided to the thread creator via that device 106, 110 and/or user account that is actively being used. If the thread creator is not actively using a device 106, 110 and/or account, a default device, such as a smart phone or tablet, can be identified and the alert can be provided to this default device. This default device can be a user device 106 and/or supervisor device 110, but can be a subset of those devices 106, 110 that is uniquely associated with the user and/or thread creator such as is the case with: a smartphone serving as the user's and/or thread creator's telephone; a personal tablet or laptop, or the like. In some embodiments, the alert can include code to direct the default device to provide an indicator of the received alert such as, for example, an aural, tactile, or visual indicator of receipt of the alert.

At decision state 916, if it is determined that the intervention was ineffective, then the process 900 returns to block 910 and proceeds as outlined above. If it is determined that the intervention was effective, then the process 900 proceeds to decision state 918 and determines if there are additional problematic conversation threads 600. In some embodiments, this can include retrieving an identifier of all problematic threads identified in block 904, and determining which of those problematic threads have received interventions. In some embodiments, for example, a value indicative of an intervention can be associated with a problematic conversation thread 600 when the intervention has been effectively completed. In some embodiments, the determination of whether there are additional problematic conversation threads 600 can include, for example, determining if there are any remaining problematic conversation threads 600 that are not associated with a value indicative of effectively completed intervention. If it is determined that there are additional problematic conversation threads 600, then the process 900 returns to block 906 and proceeds as outlined above. If it is determined that there are no additional dead conversation threads 600, then the process 900 can, in some embodiments, end.

A number of variations and modifications of the disclosed embodiments can also be used. Specific details are given in the above description to provide a thorough understanding of the embodiments. However, it is understood that the embodiments may be practiced without these specific details. For example, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A system for location-based anonymization, the system comprising:
a user device comprising location-determining features configured to determine a physical location of the user device; and
at least one server configured to:
receive a contribution from the user device via a communication network, wherein the contribution comprises content for placement in a conversation thread;
determine an anonymization level for applying to the contribution, wherein determining the anonymization level comprises:
receive physical location information identifying a physical location of the user device; and
extract data identifying an anonymization level from an anonymization table based on the physical location information, wherein the anonymization level is specific to a geographic location of a plurality of users;
anonymize a potential identifier according to the determined anonymization level when a non-match of the potential identifier and class materials associated with the conversation thread is determined; and
generate and provide an alert to the user device, wherein the alert comprises code to direct the user device to provide an indicator of receipt of the alert,
wherein the at least one server is further configured to identify the potential identifier as not an actual identifier when the potential identifier matches user data, when the potential identifier matches a portion of course materials associated with the conversation thread, and when the potential identifier is associated with the course materials.

2. The system of claim 1, wherein the at least one server is further configured to generate and provide an alert to the user device, wherein the alert comprises code to direct the user device to provide an indicator of receipt of the alert via an Input/Output subsystem of the user device, wherein the indicator of receipt of the alert comprises: an aural indicator; a tactile indicator; and a visual indicator.

3. The system of claim 1, wherein the contribution comprises contribution data identifying an originator of the contribution.

4. The system of claim 3, wherein the at least one server is further configured to determine an active location of the originator of the contribution, wherein the active location is based on the physical location of the user and on a membership of the user.

5. The system of claim 4, wherein extracting data from the anonymization table is based on the physical location information of the user device and the active location of the user.

6. The system of claim 5, wherein the at least one server is further configured to retrieve anonymization rules corresponding to the anonymization level, and wherein the location-determining features comprise a Global Positioning System receiver and a Global Positioning System antenna.

7. The system of claim 6, wherein the at least one server is further configured to retrieve the course materials associated with the conversation thread.

8. The system of claim 7, wherein the at least one server is further configured to identify the potential identifier as an actual identifier when the potential identifier matches user data and when the potential identifier does not match group materials.

9. The system of claim 8, wherein the at least one server is further configured to identify the potential identifier as not an actual identifier when the potential identifier does not match user data.

10. The system of claim 1, wherein identifying the potential identifier as not an actual identifier when the potential identifier matches user data, when the potential identifier matches group materials, and when the potential identifier is associated with the group materials comprising:
identifying a window size for evaluation, wherein the window size specifies an amount of data surrounding the potential identifier for analysis;
identifying data within the window;
analyzing the data within the window; and
outputting an indicator of association between the potential identifier and the group materials.

11. A method for location-based anonymization, the method comprising:
receiving at a server a contribution from a user device via a communication network, wherein the contribution comprises content for placement in a conversation thread;
determining with the server an anonymization level for applying to the contribution, wherein determining the anonymization level comprises:
receiving physical location information identifying a physical location of the user device; and
extracting data identifying an anonymization level from an anonymization table based on the physical location information, wherein the anonymization level is specific to a geographic location of a plurality of users;
anonymizing with the server a potential identifier according to the determined anonymization level when a non-match of the potential identifier and class materials associated with the conversation thread is determined;
identifying with the server the potential identifier as not an actual identifier when the potential identifier matches user data, when the potential identifier matches a portion of course materials associated with the conversation thread, and when the potential identifier is associated with the course materials; and
generating and providing an alert to the user device, wherein the alert comprises code to direct the user device to provide an indicator of receipt of the alert.

12. The method of claim 11, further comprising generating and providing an alert to the user device, wherein the alert comprises code to direct the user device to provide an indicator of receipt of the alert, wherein the indicator of receipt of the alert comprises one: an aural indicator; a tactile indicator; and a visual indicator.

13. The method of claim 11, wherein the contribution comprises contribution data identifying an originator of the contribution.

14. The method of claim 13, further comprising determining an active location of the originator of the contribution, wherein the active location is based on the physical location of the user and on a membership of the user.

15. The method of claim 14, wherein extracting data from the anonymization table is based on the physical location information of the user device and the active location of the user.

16. The method of claim 15, further comprising retrieving anonymization rules corresponding to the anonymization level.

17. The method of claim 16, wherein the location information is generated by location-determining features of the user device.

18. The method of claim 17, wherein the location-determining features comprise a Global Positioning System receiver and a Global Positioning System antenna.

19. The method of claim 18, further comprising identifying the potential identifier as an actual identifier when the potential identifier matches user data and when the potential identifier does not match group materials.

* * * * *